(12) United States Patent
Huang et al.

(10) Patent No.: US 7,737,928 B2
(45) Date of Patent: Jun. 15, 2010

(54) STACKED DISPLAY WITH SHARED ELECTRODE ADDRESSING

(75) Inventors: Xiao-Yang Huang, Stow, OH (US);
Asad A. Khan, Kent, OH (US); Nick M. Miller, IV, Rootstown, OH (US)

(73) Assignee: Kent Displays Incorporated, Kent, OH (US)

( * ) Notice: Subject to any disclaimer, the term of this patent is extended or adjusted under 35 U.S.C. 154(b) by 879 days.

(21) Appl. No.: 10/587,632

(22) PCT Filed: Jan. 28, 2005

(86) PCT No.: PCT/US2005/003141

§ 371 (c)(1),
(2), (4) Date: Sep. 14, 2006

(87) PCT Pub. No.: WO2005/081779

PCT Pub. Date: Sep. 9, 2005

(65) Prior Publication Data
US 2007/0139299 A1 Jun. 21, 2007

Related U.S. Application Data

(63) Continuation of application No. 11/006,100, filed on Dec. 7, 2004, now Pat. No. 7,236,151, and a continuation of application No. 10/782,461, filed on Feb. 19, 2004, now Pat. No. 7,190,337.

(60) Provisional application No. 60/565,856, filed on Apr. 27, 2004, provisional application No. 60/539,873, filed on Jan. 28, 2004, provisional application No. 60/484,337, filed on Jul. 2, 2003.

(51) Int. Cl.
*G09G 3/36* (2006.01)

(52) U.S. Cl. .......................... 345/87; 345/103

(58) Field of Classification Search ........... 345/87–102; 349/104, 114, 149
See application file for complete search history.

(56) References Cited

U.S. PATENT DOCUMENTS 3,600,060 A 8/1971 Churchhill (Continued)

FOREIGN PATENT DOCUMENTS

WO 92/11311 7/1992

(Continued)

OTHER PUBLICATIONS

*Reflective display with photoconductive layer and a bistable reflective cholesteric mixture*, Hidefumi Yoshida et al., Journal of the SID 5/3, 1997, pp. 269-274.

(Continued)

*Primary Examiner*—Nitin Patel
(74) *Attorney, Agent, or Firm*—Pearne & Gordon LLP

(57) ABSTRACT

A stacked color liquid crystal display uses shared electrode addressing including a plurality of liquid crystal layers each sandwiched between electrically conductive layers. Adjacent liquid crystal layers share one or two electrode layers located between the adjacent liquid crystal layers. A driving scheme is provided that allows the display to be driven by updating the liquid crystal layers sequentially, concurrently, or some combination of the two. Further, a method of manufacturing the display using a deposition process is also disclosed.

48 Claims, 7 Drawing Sheets

U.S. PATENT DOCUMENTS

| | | | |
|---|---|---|---|
| 3,666,881 A * | 5/1972 | Stein | 348/791 |
| 3,680,950 A | 8/1972 | Haas et al. | |
| 3,811,180 A * | 5/1974 | Braunstein et al. | 438/27 |
| 3,999,838 A * | 12/1976 | Sprokel | 349/22 |
| 4,362,903 A | 12/1982 | Eichelberger et al. | |
| 4,510,188 A | 4/1985 | Ruggeri | |
| 4,642,250 A | 2/1987 | Spector | |
| 4,684,771 A | 8/1987 | Wuthrich | |
| 4,688,900 A | 8/1987 | Doane et al. | |
| 4,747,413 A | 5/1988 | Bloch | |
| 4,890,902 A | 1/1990 | Doane et al. | |
| 4,896,946 A | 1/1990 | Suzuki et al. | |
| 4,948,232 A | 8/1990 | Lange | |
| 5,007,872 A | 4/1991 | Tang | |
| 5,061,553 A | 10/1991 | Olsen, Jr. | |
| 5,161,479 A | 11/1992 | Mahr | |
| 5,172,108 A | 12/1992 | Wakabayashi et al. | |
| 5,184,156 A * | 2/1993 | Black et al. | 351/158 |
| 5,200,845 A | 4/1993 | Crooker et al. | |
| 5,360,503 A | 11/1994 | Coffy | |
| 5,376,699 A | 12/1994 | Sage | |
| 5,437,811 A | 8/1995 | Doane et al. | |
| 5,453,863 A | 9/1995 | West et al. | |
| 5,493,430 A | 2/1996 | Lu et al. | |
| 5,530,457 A | 6/1996 | Helgeson | |
| 5,570,213 A * | 10/1996 | Ruiz et al. | 349/116 |
| 5,625,477 A | 4/1997 | Wu et al. | |
| 5,636,044 A | 6/1997 | Yuan et al. | |
| 5,644,330 A | 7/1997 | Catchpole et al. | |
| 5,668,614 A | 9/1997 | Chien et al. | |
| 5,691,795 A | 11/1997 | Doane et al. | |
| 5,712,695 A * | 1/1998 | Tanaka et al. | 349/79 |
| 5,734,155 A | 3/1998 | Rostoker | |
| 5,748,277 A | 5/1998 | Huang et al. | |
| 5,751,257 A | 5/1998 | Sutherland | |
| 5,796,447 A * | 8/1998 | Okumura et al. | 349/33 |
| 5,815,136 A | 9/1998 | Ikeda et al. | |
| 5,847,798 A | 12/1998 | Yang et al. | |
| 5,889,572 A | 3/1999 | Takahashi et al. | |
| 5,981,408 A | 11/1999 | Nakagawa et al. | |
| 5,996,897 A | 12/1999 | Prancz | |
| 6,034,752 A | 3/2000 | Khan et al. | |
| 6,061,107 A | 5/2000 | Yang et al. | |
| 6,067,134 A * | 5/2000 | Akiyama et al. | 349/74 |
| 6,072,619 A | 6/2000 | Kiryuschev et al. | |
| 6,096,666 A | 8/2000 | Jachimowicz et al. | |
| 6,133,895 A | 10/2000 | Huang | |
| 6,154,190 A | 11/2000 | Yang et al. | |
| 6,160,597 A * | 12/2000 | Schadt et al. | 349/98 |
| 6,224,964 B1 | 5/2001 | Kawai et al. | |
| 6,253,190 B1 | 6/2001 | Sutherland | |
| 6,268,839 B1 | 7/2001 | Yang et al. | |
| 6,268,841 B1 | 7/2001 | Cairns et al. | |
| 6,269,342 B1 | 7/2001 | Brick et al. | |
| 6,270,783 B1 | 8/2001 | Slavtcheff et al. | |
| 6,271,898 B1 | 8/2001 | Clikeman et al. | |
| 6,277,439 B1 | 8/2001 | Painter | |
| 6,278,429 B1 | 8/2001 | Ruth et al. | |
| 6,307,605 B1 | 10/2001 | Bailey | |
| 6,316,278 B1 | 11/2001 | Jacobsen et al. | |
| 6,320,563 B1 | 11/2001 | Yang et al. | |
| 6,359,673 B1 | 3/2002 | Stephenson | |
| 6,377,321 B1 | 4/2002 | Khan et al. | |
| 6,423,368 B1 | 7/2002 | Stephenson et al. | |
| 6,433,849 B1 | 8/2002 | Lowe | |
| 6,452,590 B1 | 9/2002 | Awamoto et al. | |
| 6,459,467 B1 | 10/2002 | Hashimoto et al. | |
| 6,468,638 B2 | 10/2002 | Jacobsen et al. | |
| 6,483,563 B2 | 11/2002 | Khan et al. | |
| 6,532,052 B1 | 3/2003 | Khan et al. | |
| 6,556,262 B1 | 4/2003 | Stephenson et al. | |
| 6,585,849 B2 | 7/2003 | Smith et al. | |
| 6,603,259 B1 | 8/2003 | Kiryuschev et al. | |
| 6,608,438 B2 | 8/2003 | Topelberg et al. | |
| 6,618,114 B1 | 9/2003 | Freeman | |
| 6,624,565 B2 | 9/2003 | Topelberg | |
| 6,628,256 B2 | 9/2003 | Nishimura | |
| 6,654,080 B1 | 11/2003 | Khan et al. | |
| 6,655,788 B1 | 12/2003 | Freeman | |
| 6,657,620 B2 | 12/2003 | Oishi et al. | |
| 6,697,191 B2 | 2/2004 | Kiryuschev et al. | |
| 6,710,760 B1 | 3/2004 | Johnson et al. | |
| 6,727,197 B1 | 4/2004 | Wilson et al. | |
| 6,788,362 B2 | 9/2004 | Stephenson et al. | |
| 6,819,310 B2 | 11/2004 | Huang et al. | |
| 6,850,217 B2 | 2/2005 | Huang et al. | |
| 6,864,435 B2 | 3/2005 | Hermanns et al. | |
| 6,902,454 B1 | 6/2005 | Petruchik | |
| 7,009,666 B2 | 3/2006 | Khan et al. | |
| 7,179,705 B2 * | 2/2007 | Ohashi et al. | 438/240 |
| 2001/0015712 A1 | 8/2001 | Hashimoto | |
| 2001/0028421 A1 * | 10/2001 | Masazumi et al. | 349/74 |
| 2002/0012077 A1 * | 1/2002 | Fukami et al. | 349/38 |
| 2002/0030776 A1 | 3/2002 | Khan et al. | |
| 2002/0030786 A1 | 3/2002 | Stephenson | |
| 2002/0140884 A1 * | 10/2002 | Richard | 349/113 |
| 2002/0186182 A1 | 12/2002 | Stephenson et al. | |
| 2003/0011549 A1 | 1/2003 | Murahashi et al. | |
| 2003/0016329 A1 | 1/2003 | Smith et al. | |
| 2003/0019575 A1 | 1/2003 | Smith et al. | |
| 2003/0031845 A1 | 2/2003 | Umeya et al. | |
| 2003/0034945 A1 | 2/2003 | Mi et al. | |
| 2003/0063245 A1 | 4/2003 | Bowley et al. | |
| 2003/0071791 A1 | 4/2003 | Hanson et al. | |
| 2003/0085380 A1 | 5/2003 | Schuhmacher et al. | |
| 2003/0117548 A1 | 6/2003 | Stephenson | |
| 2003/0155151 A1 | 8/2003 | Hermanns et al. | |
| 2003/0160912 A1 | 8/2003 | Stephenson | |
| 2003/0169221 A1 | 9/2003 | Stephenson et al. | |
| 2003/0184569 A1 | 10/2003 | Koga et al. | |
| 2003/0202136 A1 | 10/2003 | Stephenson et al. | |
| 2003/0206147 A1 | 11/2003 | Mi et al. | |
| 2003/0222139 A1 | 12/2003 | Stephenson et al. | |
| 2004/0032545 A1 | 2/2004 | Stephenson et al. | |
| 2004/0080477 A1 | 4/2004 | Capurso et al. | |
| 2004/0125298 A1 * | 7/2004 | Oh et al. | 349/129 |
| 2004/0252259 A1 * | 12/2004 | Schadt et al. | 349/98 |
| 2005/0001797 A1 | 1/2005 | Miller, IV et al. | |
| 2005/0007336 A1 | 1/2005 | Albert et al. | |
| 2005/0083284 A1 | 4/2005 | Huang et al. | |
| 2005/0162606 A1 | 7/2005 | Doane et al. | |
| 2005/0206814 A1 * | 9/2005 | Histake | 349/112 |
| 2006/0232734 A1 * | 10/2006 | Schadt et al. | 349/117 |

FOREIGN PATENT DOCUMENTS

| | | |
|---|---|---|
| WO | 2005/072447 | 8/2005 |
| WO | 2005/072455 | 8/2005 |

OTHER PUBLICATIONS

*Photostable tilted-perpendicular alignment of liquid crystals for light valves*, Anna Lackner et al., Proceedings of the SID, vol. 31/4, 1990, pp. 321-326.

*Transparent phase images in photoactivated liquid crystals*, J.S. Margerum et al., Applied Physics Letter, vol. 19, No. 7, Oct. 1, 1971, pp. 216-218.

16.3: *Development of a flexible electronic display using photographic technology*, Stanley W. Stephenson et al., SID 04 Digest, pp. 774-777.

*A fully flexible colour display*, Peter Slikkerveer et al., SID 04 Digest, pp. 770-773.

*Robust Flexible LCD's with Paintable Technology*, Joost P.A. Vogels et al., SID 04 Digest, pp. 767-769.

10.1: *Invited paper: What is electronic paper? The expectations*, Makoto Omodani, SID 04 Digest, pp. 128-131.

*Effect of woven fabric anisotropy on drape behaviour*, V. Sidabraite et al., ISSN 1392-1320, Materials Science, vol. 9, No. 1, 2003, pp. 111-115.

*The characterization of the static and dynamic drape of fabrics*, G.K. Stylios et al., J. Text. Inst., 1997, 88 Part 1, No. 4, pp. 465-475.

*Modelling the fused panel for a numerical simulation of drape*, Simona Jevsnik et al., Fibers & Textiles in Eastern Europe, Jan./Mar. 2004, vol. 12, No. 1, pp. 47-52.

*Mechanics of elastic performance of textile materials*, Chauncey Chu et al., Textile Research Journal, Aug. 1950, pp. 539-548.

*The dependence of fabric drape on bending and shear stiffness*, G.E. Cusick, J. Textile Institute 36, 11, 1965, pp. T597-T-607.

*Liquid crystal dispersions*, Paul S. Drzaic, World Scientific, Series on Liquid Crystals, vol. 1, pp. xi-xv, 1995.

6.3: *Plastic VGA reflective cholesteric LCDs with dynamic drive*, G.M. Podojil et al., SID proceedings, 1998, pp. 51-54.

13.1: *Invited Paper: Reflective color display using cholesteric liquid crystals*, K. Hashimoto et al., SID 98 Digest, pp. 897-900.

Black and white photo-addressable electronic paper using encapsulated cholester liquid crystal and organic photoconductor, T. Kakinuma et al., IDW 2002, pp. 1345-1348.

*Characterization of "Peas in a Pod", a novel idea for electronic paper*, S. Maeda et al., IDW 2002, pp. 1353-1356.

*Holographic polymer-dispersed liquid crystals (H-PDLCs)*, T.J. Bunning et al., Annu. Rev. Mater. Sci 2000, 30:83-115, pp. 83-115.

*Reflective multicolor display using cholesteric liquid crystals*, M. Okada et al., Proc, SID 97 Digest, pp. 1019-1022.

*Multiple color high resolution reflective cholesteric liquid crystal display*, D. Davis et al., Proc IDRC (242) 1997.

*Full color (4096 Colors) reflective cholesteric crystal display*, X. Huang et al., Proceedings of Asia Display 98, pp. 883-886 (1998).

Jing-Jou Tang et al., *A 30-V Row/Column Driver for PSCT LCD Using High-Voltage BiMOS Process*, Online Article, dated 1999.

http://www/us.semiconductors.philips.com/pip/PCF8578.html, LCD/row/column driver for dot matrix graphic displays, printed Jul. 8, 2003, pp. 1-3.

40CH Segment/Driver for Dot Matrix LCD, KS0065B, Samsung Electronics, 12 pages.

Doane, J. William and Khan, Asad; *Cholesteric Liquid Crystals for Flexible Displays*, in *Flexible Flat Panel Displays*, Ed. G. Crawford) John Wiley & Sons, England, Chapter 17 (2005) pp. 331-354.

Doane, J. William, "*Polymer Dispersed Liquid Crystal Displays*", in *Liquid Crystals: Applications & Uses*, Ed. Birendra Bahadur (World Scientific Pub. 1990), Chapter 14, pp. 361-395.

Luo, F.C., "*Active Matrix LC Displays*", in *Liquid Crystals: Applications & Uses*, (ed. B. Bahadur), World Scientific, Singapore, Chapter 15, pp. 397-436.

* cited by examiner

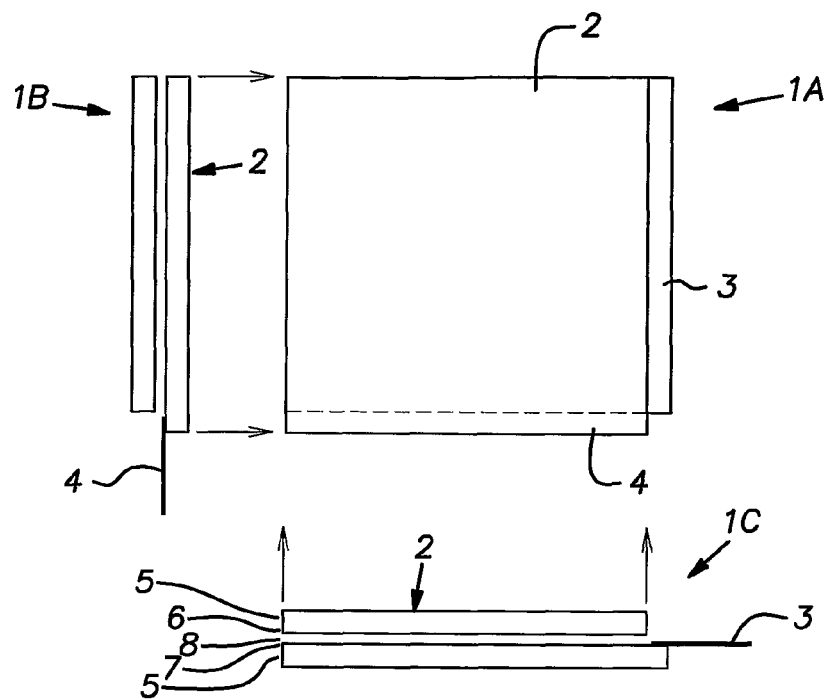
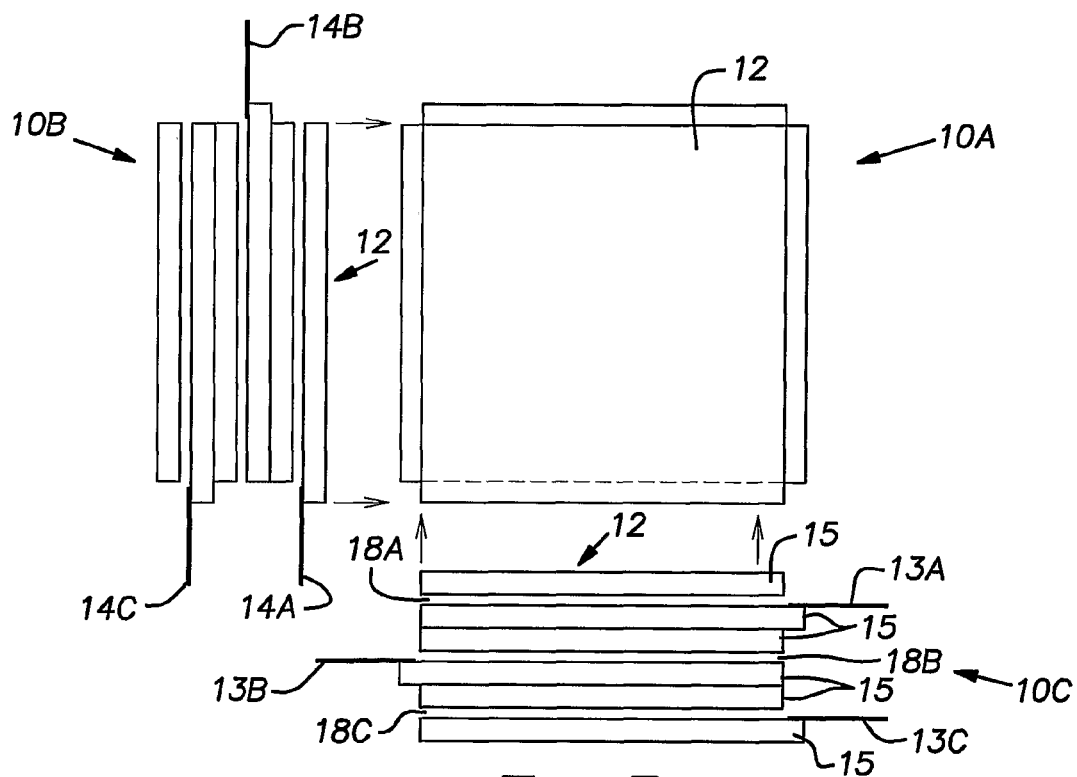

STACKED DISPLAY WITH SHARED ELECTRODE ADDRESSING

RELATED APPLICATIONS

The present application is a 371 of U.S. Patent Application No. PCT/US2005/003141, which was published in English on Sep. 9, 2005, which is a continuation of U.S. patent application Ser. No. 11/006,100, U.S. Pat. No. 7,236,151, filed Dec. 7, 2004 (hereinafter "Flexible Display Application") and Ser. No. 10/782,461, U.S. Pat. No. 7,190,337, filed Feb. 19, 2004, which are incorporated herein by reference in their entireties. U.S. patent application Ser. No. 11/006,100 claims benefit of provisional application Nos. 60/565,856, filed on Apr. 27, 2004 and 60/539,873 filed on Jan. 28, 2004. U.S. patent application Ser. No. 10/782,461 claims benefit of provisional application No. 60/484,337, filed on Jul. 2, 2003.

This application was made in part with United States Government support under cooperative agreement DAAB07-03-C-J406 awarded by the Defense Advanced Research Projects Agency (DARPA). The government has certain rights in this invention.

FIELD OF THE INVENTION

This application relates generally to driving a layered liquid crystal display.

More specifically, this application relates to a color display utilizing layered bistable liquid crystals with shared electrode addressing.

BACKGROUND OF THE INVENTION

Bistable displays that do not require continuous voltage application to maintain their state are becoming particularly important in low power applications. Various technologies can be utilized to provide bistable displays, including, but not limited to: Cholesteric Liquid Crystal Displays (ChLCD); Electrophoretic Displays; Bi-Stable STN Displays; Bi-Stable TN Displays; Zenithal Bi-Stable Displays; Bi-Stable Ferroelectric Displays (FLCD); Anti-Ferroelectric Displays; Interferometric Modulator Display (IMoD); and Gyricon displays (oil-filled cavity, beads are "bichromal," and charged).

In particular, bistable reflective cholesteric liquid crystals (ChLCs) have been of great interest in the last several years because of their excellent optical properties and low power advantage. Two major ChLC drive schemes are known to be available at this time: (1) conventional drive and (2) dynamic drive. Typically, ChLC displays (ChLCDs) require drive voltages around 40V. High multiplex, off-the shelf (OTS) STN-LCD drivers can accommodate this requirement for a conventional drive. However, off-the-shelf drivers for commercial dynamic drive ChLCDs would be beneficial.

Further, the development of purely reflective display technologies enables a very power efficient display module in that backlighting of the display is not necessary. However, this type of system is severely challenged in achieving full color. Typical display technologies achieve full color imaging through the use of individual red, green and blue (RGB) pixels that are typically patterned side-by-side rather than on top of one another. Resulting color images are obtained by allowing light through the appropriate pixels.

For example, if the RGB sub-pixel sizes are about equal, a purely red image will be created by turning on the red sub-pixels, and turning the green and blue sub-pixels off. Purely blue and green colors are likely generated by activating only those color pixels. Other colors are generated by using combinations of the primary pixel colors in various shades, for example.

However, the above implementation can result in very poor performance when applied to purely reflective technologies such as Cholesteric LCDs (ChLCDs). In such cases, the amount of light reflected from the desired color may not be of sufficient intensity to overcome the effects of the neighboring pixels that are not reflecting. These types of reflective systems can result in total reflectivity of around $\frac{2}{3}$ less than a single pixel of comparable size as the three RGB pixel, because the amount of surface area available for reflecting light is reduced by dividing the pixel area into sub-pixels. This may result in images that are below desirable contrast and brightness levels.

In addition, it can be physically challenging to accommodate the packaging and interconnects of the three sets of drive electronics to the LCD. Modern display drive electronics have evolved to offer dual-mode drive electronics, i.e., display drivers that can function as both a row driver and a column driver depending upon mode configuration. However, previously a single driver IC could not perform both row and column functionality at one time.

Examples of color imparting layers are provided in U.S. Pat. No. 5,493,430, entitled "Color, Reflective Liquid Crystal Displays," which is incorporated herein by reference in its entirety. Application Ser. No. 09/329,587, filed on Jun. 10, 1999 entitled "Stacked Color Liquid Crystal Display Device," is also incorporated herein by reference in its entirety.

Co-pending application Ser. No. 10/782,461, filed on Feb. 19, 2004 incorporated herein by reference, discloses a configurable driver IC that can utilize a single IC to drive both row and column electrodes concurrently, or that can be cascaded with additional driver ICs to provide a flexible display driver solution. It would be useful to provide a display that can utilize such a driver to simplify the driving scheme.

DISCLOSURE OF THE INVENTION

The present invention is directed to a liquid crystal display having a plurality of stacked layers including a plurality of layers of liquid crystal material each having opposing surfaces. A plurality of electrically conductive layers are disposed so as to be located near both of the opposing surfaces of the liquid crystal layers, wherein only one of the electrically conductive layers is disposed between adjacent liquid crystal layers. Drive electronics are adapted to apply the same voltages pulses to adjacent liquid crystal layers along the only one electrically conductive layer.

More specifically, the drive electronics includes one driver corresponding to each of the electrically conductive layers. The driver may comprise multiple drive chips. The liquid crystal material comprises regions of liquid crystal dispersed in a polymer matrix. The liquid crystal material comprises bistable cholesteric liquid crystal. Electrode lines of one of the electrically conductive layers are arranged perpendicular to electrode lines of an adjacent one of the electrically conductive layers. The display is comprised of a plurality of pixels, with each pixel including a sub-pixel from each of the plurality of layers of liquid crystal material. When a pixel is to be updated, the sub-pixels are addressed in sequence, such that while one sub-pixel is addressed to impose a brightness state change on that sub-pixel the remaining sub-pixels of that pixel are simultaneously addressed to maintain their current brightness state. The display may include only a single substrate on which the layers of the display are supported.

Yet another aspect of the invention features a liquid crystal display comprising: a first liquid crystal layer comprising liquid crystal that is bistable in an absence of an electric field; a second liquid crystal layer comprising liquid crystal that is bistable in an absence of an electric field stacked upon the first liquid crystal layer; only a single electrode layer disposed between the first and second liquid crystal layers; and drive electronics electrically connected to the single electrode layer adapted to address both the first liquid crystal layer and the second liquid crystal layer with the same voltage pulses. The first and second liquid crystal layers comprise a dispersion of liquid crystal material (e.g., bistable cholesteric liquid crystal material) in a polymer matrix.

Another aspect of the invention is a stacked liquid crystal display sequentially comprising the following stacked layers: a top electrode layer of electrodes; a first liquid crystal layer; an upper middle electrode layer of electrodes; a second liquid crystal layer; a lower middle electrode layer of electrodes; a third liquid crystal layer; a bottom electrode layer of electrodes, and a shared electrode addressing construction in which the upper middle electrode layer is adapted to enable driving of the first liquid crystal layer and the second liquid crystal layer and the lower middle electrode layer is adapted to enable driving of the second liquid crystal layer and the third liquid crystal layer.

More specifically, the display is adapted as follows. A reflective state of a portion of the first liquid crystal layer corresponding to a pixel of the display is changed by providing a first non-zero voltage difference between an electrode of the top electrode layer and an electrode of the upper middle electrode layer. A reflective state of the portion of the first liquid crystal layer is maintained by providing a voltage difference less than a voltage threshold needed to change the reflective state of the liquid crystal between the top electrode layer and the upper middle electrode layer. A reflective state of a portion of the second liquid crystal layer also corresponding to the pixel of the display is changed by providing a second non-zero voltage difference between an electrode of the upper middle electrode layer and an electrode of the lower middle electrode layer. A reflective state of a portion of the third liquid crystal layer also corresponding to the pixel of the display is changed by providing a third non-zero voltage difference between an electrode of the lower middle electrode layer and an electrode of the bottom electrode layer. The reflective states of the portions of the first, second and third liquid crystal layers all corresponding to the pixel of the display are updated sequentially in time to update a state of the pixel. Alternatively, the reflective states of two of the portions of the first, second and/or third liquid crystal layers each corresponding to the pixel of the display can be updated concurrently in time to at least partially update a state of the pixel. Each of the liquid crystal layers may comprise a dispersion of cholesteric liquid crystal in a polymer matrix.

In particular, one aspect of the display is adapted as follows. A reflective state of a portion of the first liquid crystal layer corresponding to a pixel of the display is changed by providing a voltage difference between an electrode of the top electrode layer and an electrode of the upper middle electrode layer. A reflective state of a portion of the second liquid crystal layer corresponding to the pixel of the display is changed by providing a voltage difference between an electrode of the upper middle electrode layer and an electrode of the lower middle electrode layer. A reflective state of a portion of the third liquid crystal layer corresponding to the pixel of the display is changed by providing a voltage difference between an electrode of the lower middle electrode layer and an electrode of the bottom electrode layer. The foregoing enables updating a reflective state of the pixel of the display.

Still further, the display is adapted as follows. A threshold voltage is needed to change a reflective or brightness state of the liquid crystal. A reflective state of the portion of the first liquid crystal layer is maintained by providing a voltage difference between the electrode of the top electrode layer and the electrode of the upper middle electrode layer below the threshold voltage. A reflective state of the portion of the second liquid crystal layer is maintained by providing a voltage difference between the electrode of the upper middle electrode layer and the electrode of the lower middle electrode layer below the threshold voltage. A reflective state of the portion of the third liquid crystal layer is maintained by providing a voltage difference between the electrode of the lower middle electrode layer and the electrode of the bottom electrode layer below the threshold voltage.

More specifically, the display is further adapted such that the reflective states of two or more of the portions of the first, second, and third liquid crystal layers are updated sequentially in time. Alternatively, the reflective states of two or more of the portions of the first, second, and third liquid crystal layers are updated concurrently in time. The electrodes (e.g., electrode lines) of one of the electrode layers are arranged perpendicular to the electrodes (e.g., electrode lines) of an adjacent one of the electrode layers.

Another aspect of the invention is directed to a stacked liquid crystal display comprising: a top electrode layer of electrodes; an upper middle electrode layer of electrodes; a first liquid crystal layer sandwiched between the top electrode layer and the upper middle electrode layer; a lower middle electrode layer of electrodes; a second liquid crystal layer sandwiched between the upper middle electrode layer and the lower middle electrode layer; a bottom electrode layer of electrodes; and a third liquid crystal layer sandwiched between the lower middle electrode layer and the bottom electrode layer.

In particular, a pixel of the display described in the preceding paragraph includes a portion of the first liquid crystal layer adapted to be addressed by the combination of an electrode of the top electrode layer and an electrode of the upper middle electrode layer. The pixel of the display further includes a portion of the second liquid crystal layer adapted to be addressed by the combination of an electrode of the upper middle electrode layer and an electrode of the lower middle electrode layer. The pixel of the display further includes a portion of the third liquid crystal layer adapted to be addressed by the combination of an electrode of the lower middle electrode layer and an electrode of the bottom electrode layer. In particular, a brightness state of the pixel is updated by addressing the portions of the liquid crystal layers in sequence. The total number of the plurality of outputs necessary to drive the display is less than the total number of electrodes in the electrode layers.

Another aspect of the invention features a stacked liquid crystal display comprising: a top electrode layer of electrodes and an upper middle electrode layer of electrodes. A first liquid crystal layer is sandwiched between the top electrode layer and the upper middle electrode layer. A brightness state of a portion the first liquid crystal layer corresponding to a pixel of the display is changed by providing a non-zero voltage difference between an electrode of the top electrode layer and an electrode of the upper middle electrode layer. A brightness state of the portion of the first liquid crystal layer is maintained by providing substantially no voltage difference between the electrode of the top electrode layer and the electrode of the upper middle electrode layer. The display also includes a lower middle electrode layer of electrodes. A second liquid crystal layer is sandwiched between the upper middle electrode layer and the lower middle electrode layer. A brightness state of a portion of the second liquid crystal layer corresponding to the pixel of the display is changed by providing a non-zero voltage difference between an electrode of the upper middle electrode layer and an electrode of the lower middle electrode layer. A brightness state of the portion of the second liquid crystal layer is maintained by providing substantially no voltage difference between the electrode of the upper middle electrode layer and the electrode of the lower middle electrode layer. Also included is a bottom electrode layer of electrodes. A third liquid crystal layer is sandwiched between the lower middle electrode layer and the bottom electrode layer. A brightness state of a portion of the third liquid crystal layer corresponding to the pixel of the display is changed by providing a non-zero voltage difference between an electrode of the lower middle electrode layer and an electrode of the bottom electrode layer. A brightness state of the portion of the third liquid crystal layer is maintained by providing substantially no voltage difference between the electrode of the lower middle electrode layer and the electrode of the bottom electrode layer. The pixel is formed by a stacked (e.g., vertical) arrangement of the portions of the first, second, and third liquid crystal layers such that a color of the pixel is formed by light reflecting from all of the portions of the first, second, and third liquid crystal layers. A brightness state of the pixel of the display is updated by changing and/or maintaining the brightness states of the portions of the first, second, and third liquid crystal layers sequentially or concurrently. More specifically, one or more of the first, second, and third liquid crystal layers include a cholesteric liquid crystal material.

Another aspect of the present invention features a multilayer stacked liquid crystal display film comprising a plurality of liquid crystal film layers and a plurality of electrode film layers for driving the plurality of liquid crystal film layers. All of the film layers are printed or coated in a stack upon each other. A pixel is formed from a portion of each of the plurality of liquid crystal layers, such that a color or shade of the pixel is formed by light reflecting from all of the portions of the plurality of liquid crystal layers. At least one of the plurality of electrode layers is adapted to enable driving of two adjacent liquid crystal layers. In particular, each of the portions of the plurality of electrode layers is driven sequentially in time to change or maintain the color of the pixel.

Another aspect of the invention features a stacked display comprising a base substrate and a plurality of film layers printed or coated onto each other in a stack and supported on the substrate. The film layers comprise a plurality of conducting film layers and a plurality of liquid crystal dispersions film layers. Each of the liquid crystal dispersion layers comprises regions of liquid crystal material dispersed in a polymer matrix. The liquid crystal dispersion layers are separated by the conducting layers. At least one of the plurality of conducting layers is adapted to enable driving of two adjacent liquid crystal dispersion layers. In particular, flexible interconnects extend from each of the conducting film layers at a side of the display to conductors located on the substrate at the same side of the display. The plurality of liquid crystal dispersion layers includes at least three liquid crystal dispersion layers and the liquid crystal material includes bistable cholesteric liquid crystal material. The plurality of liquid crystal dispersion layers may include at least six liquid crystal dispersion layers and the liquid crystal material in the display includes bistable cholesteric liquid crystal material.

Another aspect features a liquid crystal display comprising: a first liquid crystal layer comprising liquid crystal that is bistable in an absence of an electric field; a second liquid crystal layer comprising liquid crystal that is bistable in an absence of an electric field stacked upon the first liquid crystal layer, wherein the liquid crystal is a dispersion of liquid crystal in a polymer matrix; a first electrode layer disposed between the first and second liquid crystal layers; a second electrode layer disposed between the first and second liquid crystal layers; electrical interconnects that electrically connect the first and second electrode layers together in parallel; and drive electronics electrically connected to the electrical interconnects adapted to address both of the first and second liquid crystal layers with the same voltage pulses. More specifically, the liquid crystal material is a dispersion of liquid crystal (e.g., bistable cholesteric liquid crystal material) in a polymer matrix. The liquid crystal layers may reflect visible and infrared light.

It should be appreciated that the liquid crystal display of the invention may include various numbers of liquid crystal layers, electrically conductive layers and drivers. That is, even though only a certain number of liquid crystal layers, electrically conductive layers and drivers are described in a particular display (e.g., three liquid crystal layers and a suitable number of electrically conductive layers and drivers), the invention also encompasses additional liquid crystal layers, corresponding electrically conductive layers and drivers (e.g., 6 or more liquid crystal layers and a suitable number of electrically conductive layers and drivers).

Many additional features, advantages and a fuller understanding of the invention will be had from the accompanying drawings and the detailed description that follows. It should be understood that the above Disclosure of the Invention describes the invention in broad terms while the following Detailed Description describes the invention more narrowly and presents specific embodiments which should not be construed as necessary limitations of the invention as defined in the claims.

BRIEF DESCRIPTION OF THE DRAWINGS

FIG. 1 shows a schematic of a top view 1A, a side view 1B, and a front view 1C of a single layer for a typical Liquid Crystal Display;

FIG. 2 shows a schematic of a top view 10A, a side view 10B, and a front view 10C of a stack of 3 layers of FIG. 1 for a typical Liquid Crystal Display;

DETAILED DESCRIPTION

Figure 3:
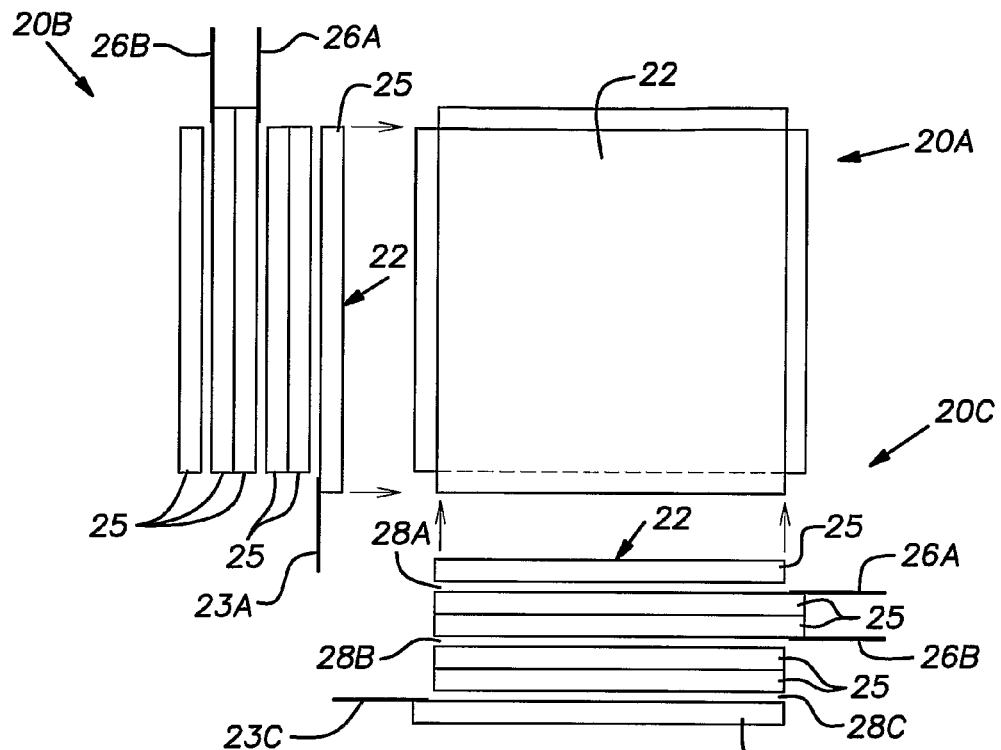
FIG. 3 shows a schematic of a top view 20A, a side view 20B, and a front view 20C of a stack of 3 layers of a modified Liquid Crystal Display according to one aspect of the invention.

Reflective display technologies, such as liquid crystal (LC) display materials, and especially those that utilize bistable liquid crystal material, can compensate for some or all of the above-identified problems by developing methods of stacking (or layering) displays of different color characteristics to achieve color pixilation that is not reduced as in the case of spatial distribution of the pixels in one plane. The stacking of bistable LC materials such as ChLCs, for example, is a viable way to produce full color display systems. Reference in this disclosure to "bistable" displays encompasses "multistable" displays that exhibit various stable gray scale levels between the fully reflective or bright (planar) state and the fully non-reflective or dark (focal conic) state.

Stacking the LC materials such that electromagnetic radiation such as visible light travels successively through a number of layers of the LC material allows a pixel to be designed using a stack of differently colored sub-pixels, instead of the traditional side-by-side colored subpixels. Thus, the inventive sub-pixels are layered or stacked on top of each other (e.g., vertically in multiple planes), rather than arranged side-by-side in one plane, to form each pixel, or character, line, arc, or other item, as the case may be.

Stacking is particularly useful for bistable LC displays, because once a desired state has been obtained, the bistable LC will maintain that state with no voltage being applied (or with a net zero voltage field applied or when subjected to a non-zero voltage field that is less than the threshold voltage or minimum voltage at and above which the pixel changes state). This simplifies the voltage driving scheme, as will be apparent by the discussion below.

The invention could be applied to other LC displays as well. For example, in traditional STN LC technologies, if the drive frequency is fast enough such that the LC state persists sufficiently long between updates, the proper color effects can still be achieved. Alternatively, complicated drive voltage schemes could be provided that support state maintenance of LC layers, but at the cost of greater complexity. Accordingly, bistable displays are the most suitable for the stacking concept at this time, but are not the only LC technology that can be supported.

The stacking of multiple display layers presents several problems associated with their cost. Of primary concern is the need for three complete sets of drive electronics, which could result in higher costs. In this regard, each display layer (one of which is shown in FIG. 1) requires a ledge of row drivers 3 and an adjacent ledge of column drivers 4 that sandwich a liquid crystal (LC) layer 8, all between glass substrates 5. Electrode layers 6 and 7 would be connected to the row driver 3 and column driver 4, respectively. The electrode layers can each be provided on a substrate which might be one of the glass layers 5, or some other substrate such as plastic.

The stacking of a plurality of the LC layers of FIG. 1 embodies plural sets of drive electronics—one set for each display layer. Each set of drive electronics includes a corresponding bank of electronics on an edge of the substrate to provide row drive functionality and a bank of corresponding electronics on an adjacent edge of another substrate to provide column drive functionality.

This approach can be visualized by imagining three individual LCDs (for the three primary colors red, green and blue) with edge mounted driver ICs stacked so that the pixel locations are vertically aligned, viewed from a top 12, as shown in the top view 10A of FIG. 2. If each display color has one unit of column drivers and one unit of row drivers, the resulting stack will have six units of drive electronics. This is demonstrated in FIG. 2 by showing an exemplary arrangement of banks 13A, 13B, 13C (row drivers) and 14A, 14B, and 14C (column drivers).

The LC layers 18A, 18B, and 18C would be placed between the corresponding electrode layers. Thus, the first LC color layer 18A is between a corresponding pair of row and column electrode layers driven by row driver 13A and column driver 14A, respectively. The second LC color layer 18B is between a corresponding second pair of row and column electrode layers driven by row driver 13B and column driver 14B, respectively. Finally, the third LC color layer 18C is between a third pair of corresponding row and column electrode layers driven by row driver 13C and column driver 14C, respectively. As shown below, this design can be improved upon.

To simplify the above design, it is possible to align the stack in different orientations by rotating the substrates in 90° increments about the horizontal axis and 180° increments about the vertical axis (flipped so the opposite side of the display is viewed). These degrees of freedom can allow a stacked configuration that has adjacent electrodes as shown in FIG. 3.

Using dual mode drivers that can be configured as either row or column driving mode (as described in co-pending application Ser. No. 10/782,461, filed on Feb. 19, 2004, incorporated herein by reference), it is possible to reduce the number of drivers detailed in FIG. 2 by connecting at least some pairs of the electrode layers in parallel and using a single driver for each of those connected electrode pairs. It will be appreciated that each driver may include multiple drive chips (e.g., two or more drive chips for driving the rows electrodes of one of the liquid crystal layers). Thus, the drivers labeled as 26A and 26B in FIG. 3 have each replaced a pair of the electrode drivers of FIG. 2 with a single driver entity by connecting the top and bottom of their respective substrates together so they drive in parallel. Accordingly, the LC layers 28A, 28B, and 28C are still between electrode layers (formed on or adjacent to substrate layers 25 in this particular design), and the middle electrode layers are connected together in pairs so as to be concurrently driven. The outer electrodes layers are still independent, and thus driven, in the given example, by row drivers 23A and 23C, respectively. Accordingly, the driver electronics are simplified.

The above solution can be accomplished using standard interconnect material such as a flexible circuit bonded to the substrate or a zebra strip to connect the top and bottom of the substrates together and to a PCB.

A further improvement of the above design is to make the display system such that the layer or substrate separating adjacent liquid crystal layers is so small that it becomes negligible or nonexistent. As the thickness of the substrate is reduced, the attenuation effect that the substrate has on the voltages can become negligible. This allows liquid crystal on both sides of the substrate to be driven by the same voltage signals at the same time. This enables replacing two electrode layers between adjacent liquid crystal layers (e.g., 26A, 26B) with a single electrode layer between adjacent liquid crystal layers.

Rather than using a conventional substrate (such as a glass substrate or thick plastic substrate that is much thicker than the liquid crystal layer) this embodiment could employ a conducting layer alone in the case where the individual display layers do not need added barrier properties due to their characteristic ability to inherently avoid chemical or molecular diffusion between adjoining layers. Barrier, isolation or electrically insulating layers can also be used between liquid crystal layers, e.g., on either side of electrically conducting layers. The stacked display system may be assembled using layer or thin film deposition processes (e.g., machine printing or coating film layers) as disclosed in the Flexible Display Application and the Display Films Application.

Figure 4:
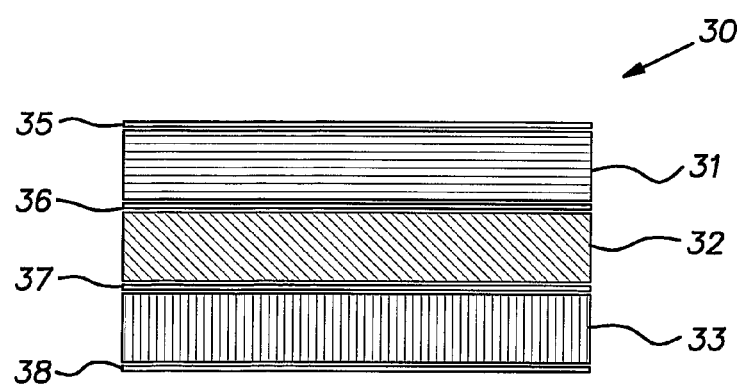
FIG. 4 shows a schematic of a side view of another aspect of the invention, with three LC layers sandwiched between four electrode layers, eliminating two of the electrode layers of FIG. 3.

This efficient system of the present invention is demonstrated in FIG. 4. Three LC layers 31, 32, and 33 are sandwiched between four electrode layers 35, 36, 37, and 38, as shown in the figure. Thus, two electrode layers are eliminated in this inventive design compared to FIG. 3.

Figure 5:
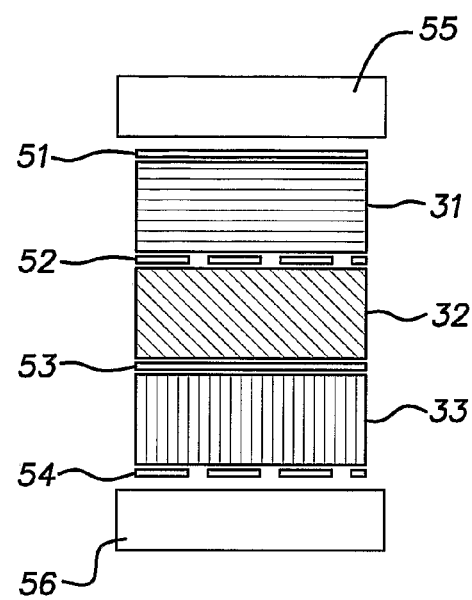
FIG. 5 shows a schematic of a side view of still another aspect of the invention, where the electrodes are arranged in alternating "row"/"column" format.

FIG. 5 shows the inventive design described above in more detail. The electrodes are arranged in alternating "row"/"column" format (i.e., parallel electrode lines in one electrode layer are orthogonal to parallel electrode lines in an adjacent electrode layer. Throughout this disclosure, the geometric designations "row" and "column" are arbitrary and thus, are interchangeable. The electrode "rows" and "columns" extend in a plane perpendicular to the page. References below to relative rotations of electrode layers, occur in that plane about an axis perpendicular thereto. It will also be appreciated that the drawings are not to scale.

FIG. 5 shows the top electrode layer 51 (made up of a series of "rows", for example, with a row traveling from left to right and thus across the figure). A clear coat or barrier or protective layer or layers 55 is optionally formed on the electrode layer 51. This is followed by the first liquid crystal layer 31. Each liquid crystal layer may be comprised of sublayers. The upper middle electrode layer 52 follows the LC layer 31. An optional barrier and/or electrically insulating layer(s) are formed between liquid crystal layers 31 and 32 on either side of the electrode layer 52. The lines of electrodes in layer 52 are oriented at a rotation of 90 degrees with respect to the top electrode layer and thus would be a series of "columns", for example. The second LC layer 32 then follows the upper middle electrode layer 52, and is followed by the lower middle electrode layer 53. Optional barrier and/or electrically insulating layer(s) are formed between liquid crystal layers 32 and 33 on either side of electrode layer 53. The lines of electrodes in layer 53 are oriented at a rotation of 90 degrees with respect to the electrode layer 52 and thus, are perpendicular to the electrode line directions in layers 52 and 54 and parallel to the electrode line directions in top electrode layer 51. Finally, the third LC layer 33 follows the electrode layer 53. Optional barrier and/or electrically insulating layer(s) are formed between the liquid crystal 33 and optional substrate 56 on either side of the electrode layer 54. The lines of electrodes in layer 54 are oriented at a rotation of 90 degrees with respect to the previous electrode layer 53 and thus, are parallel to the electrode lines of layer 52. The substrate 56 may be an integral part of the display that is fabricated with the other layers; it may have the other layers 51-54 and 31-33 that were separately fabricated subsequently attached to it, or the substrate 56 may be omitted entirely or replaced with a barrier or protective layer or layers.

A substrate as defined herein is a structure that supports components of a liquid crystal display including a liquid crystal layer that is electrically addressed to produce images. The substrate need not be rigid but can be flexible or drapable as disclosed in U.S. application Ser. No. 11/006,100, filed Dec. 7, 2004, which are incorporated herein by reference in their entirety. Glass, metal, polymer, paper and fabric or textile can all be used as substrate materials. The substrate is a generally thin layer, but is often significantly thicker than other components of the display. As defined herein and consistent with U.S. Pat. No. 6,788,362 owned by Kodak, a substrate is a layer that has a thickness of at least 20 microns and, in particular, at least 50 microns. Substrates of liquid crystal displays on the market today can have a thickness of 100 microns or more and substrates such as fabrics can be substantially thicker exceeding 1000 microns. The substrate can be formed of or have various components attached to it such as electrodes, an active matrix backplane, solar cell, photovoltaic device and the like. The present invention is usable in connection with displays employing one, two, or more substrates. A casting layer as defined herein is a film layer of the inventive multilayer film applied on or near the release liner on which other film layers of the display may be printed or coated. The invention may employ various layers that function as casting layers including a preparation layer, electrode layer, adhesive layer, planarization layer, liquid crystal layer, isolation layer and combinations thereof as described in the Flexible Display Application and Display Films Application. The multifunctionality of the layers of the inventive display film is discussed in more detail below.

For a full-color display, the three LC layers 31, 32, and 33 each reflect different colors (e.g., blue, green and red, respectively). See, for example, M. Okada, T. Hatano, K. Hashimoto, Proc. SID, (1019) 1997. D. Davis, K. Hoke, A. Khan, C. Jones, X.-Y. Huang, J. W. Doane, Proc. IDRC, (242) 1997. See also U.S. Pat. Nos. 6,377,321 B1 and 6,654,080 B1, herein incorporated by reference in their entireties, for examples of similar displays.

By utilizing gray scale functionality, possibly providing up to 256 or more shades of "gray" for each LC layer by utilizing various driving methods (see, for example, U.S. Pat. No. 5,453,863, incorporated herein by reference) many colors might be provided. Because the colors are seen in a serial, stacked manner, the color may appear more "pure" and less pixilated than current side-by-side displays, even improving upon the perceived resolution of the image.

The reduced driver stacked system shown in FIG. 5 can be updated in stages. That is, one LC layer can be addressed at a time, taking up to three stages (steps) to entirely update a pixel. Each LC layer can be considered a "sub-pixel" with each pixel being made up of three sub-pixels in a three-primary color arrangement. While one LC layer (i.e., sub-pixel) is addressed and its state updated, the other layers are maintained in their current state by creating the appropriate net voltage between them (typically zero), and each layer is thereby updated in turn. The other sub-pixel layers can be changed with the layer that is being addressed as long as they have not been updated yet. That is, if the top sub-pixel is being updated first (with the intention of subsequently updating sub-pixel layers two and three), it does not matter if the content of the bottom two sub-pixel layers change or are corrupted, as they will be addressed next.

Figure 6:
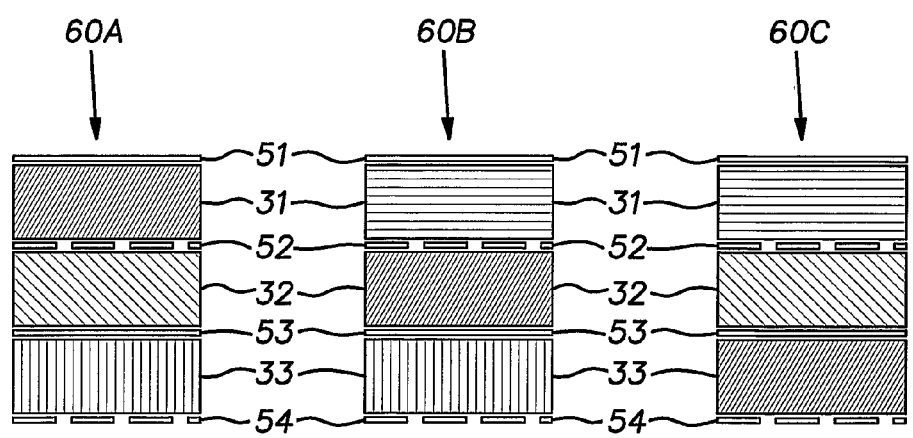
FIG. 6 shows a schematic of a sequence of side views of the aspect of the invention of FIG. 5, showing the addressing of each layer of the display in sequence.

This sequence is shown schematically in the series of sketches of FIG. 6. In the first step 60A, electrodes 51 and 52 are selected, providing a chosen voltage difference (such as a pulse, waveform, dc bias, etc.) between them that is greater than or equal to the threshold voltage. The desired voltage difference depends on the chosen LC material, and is provided by the appropriate driver circuitry (not shown). This voltage is used to update the state of LC layer 31, shown as undergoing a transition by its shaded nature.

At the same time, the voltages of electrodes 53 and 54 are put into a non-select state, which for a bistable LC material would likely be such that the net voltage between the electrodes would sum to a zero voltage or a net voltage that is less than the threshold voltage. For a bistable LC, electrodes 53 and 54 could be driven by the same or nearly the same voltage pattern as electrode 52 to result in either a zero net voltage between them or a net voltage that is less than the threshold voltage, which for a bistable LC material is capable of maintaining the state of LC layers 32 and 33. However, for a non-bistable LC, the voltages of the electrodes 53 and 54 would be chosen to maintain the current state of the LC layers 32 and 33, respectively, which could well result in a non-zero voltage between LC layers 32 and 33, with the actual desired voltage depending on the properties of the LC material (which may require a particular "maintaining" drive voltage to prevent an undesired state change, for example).

Next, the second step 60B of FIG. 6 is implemented. In this step, the LC layer 32 is to undergo a state change. Thus, a particular voltage difference between electrode layers 52 and 53 greater than or equal to the threshold voltage is used to effect the state change, and will be implemented according to the desired final state of LC layer 32 (again, the voltages applied depend on the LC material).

However, because no change is desired in layers 31 and 33, electrode layer 51 and electrode layer 54 are driven in a non-select state to prevent any change in the state of LC layers 31 and 33. Again, if a bistable LC is chosen, and a zero-voltage difference or a net voltage difference that is less than the threshold voltage is desired across LC layers 31 and 33, then electrode layer 51 is driven to the same or similar voltage as electrode layer 52, and electrode layer 54 is driven to the same or similar voltage as electrode layer 53, resulting in a net voltage difference between them that will not result in a state change in the LC material between them, which maintains the states of the LC layers 31 and 33.

Again, different LC materials can be supported (such as non-bistable materials) by driving the voltages of the electrode layers 51 and 54 to provide the proper maintenance voltage between layers 31 and 33.

Finally, step 60C of FIG. 6 is carried out. LC layer 33 is updated by providing the proper voltages to electrode layers 53 and 54 above threshold voltage, while electrode layers 51 and 52 are put into a non-select state (which for bistable LCs would likely be driving the electrode 51, 52 voltages to the same or similar levels as electrode layer 53, thus resulting in a net voltage across the maintained LC layers too low to cause a state change).

A simple system as in FIG. 6 can likely apply a net zero voltage across layers that require no state change. However, for a multiple pixel system such as a typical passive matrix display, the layers that are intended not to be changed typically cannot be driven to the exact voltage as the layer being addressed. In the practical case, for the "non-select" state, the net voltage is typically not zero across the liquid crystal, but is designed to be less than the threshold voltage and thus, no change occurs as in the net zero voltage case.

As discussed above, for a bistable LC design, the LC layer to be updated is provided with a voltage difference between the electrodes required to implement the desired state, while the remaining layers are put into a "non-select" mode so as to maintain their state. Thus, for bistable designs (e.g., using ChLC materials), typically, a net voltage that is less than planar-focal conic transition threshold voltage is provided. However, many different LC material implementations could be accommodated by choosing the proper drive voltage scheme to provide the proper maintenance voltages, depending on the chosen material.

Typically, for passive matrix drive schemes, in order to set a particular pixel, a row voltage drive mode provides a certain voltage signal, and a column voltage drive mode provides a different voltage signal, the difference between the two signals being important for setting the pixel state. Refer to "Driving Method for Polymer Stabilized and Polymer Free Liquid Crystal Displays," U.S. Pat. No. 5,644,330 to Catchpole, Yuan, Lu, Huang, herein incorporated by reference. These voltages are typically used to drive a row and a column, respectively, which intersect at a single pixel and set that pixel state.

Figure 8:
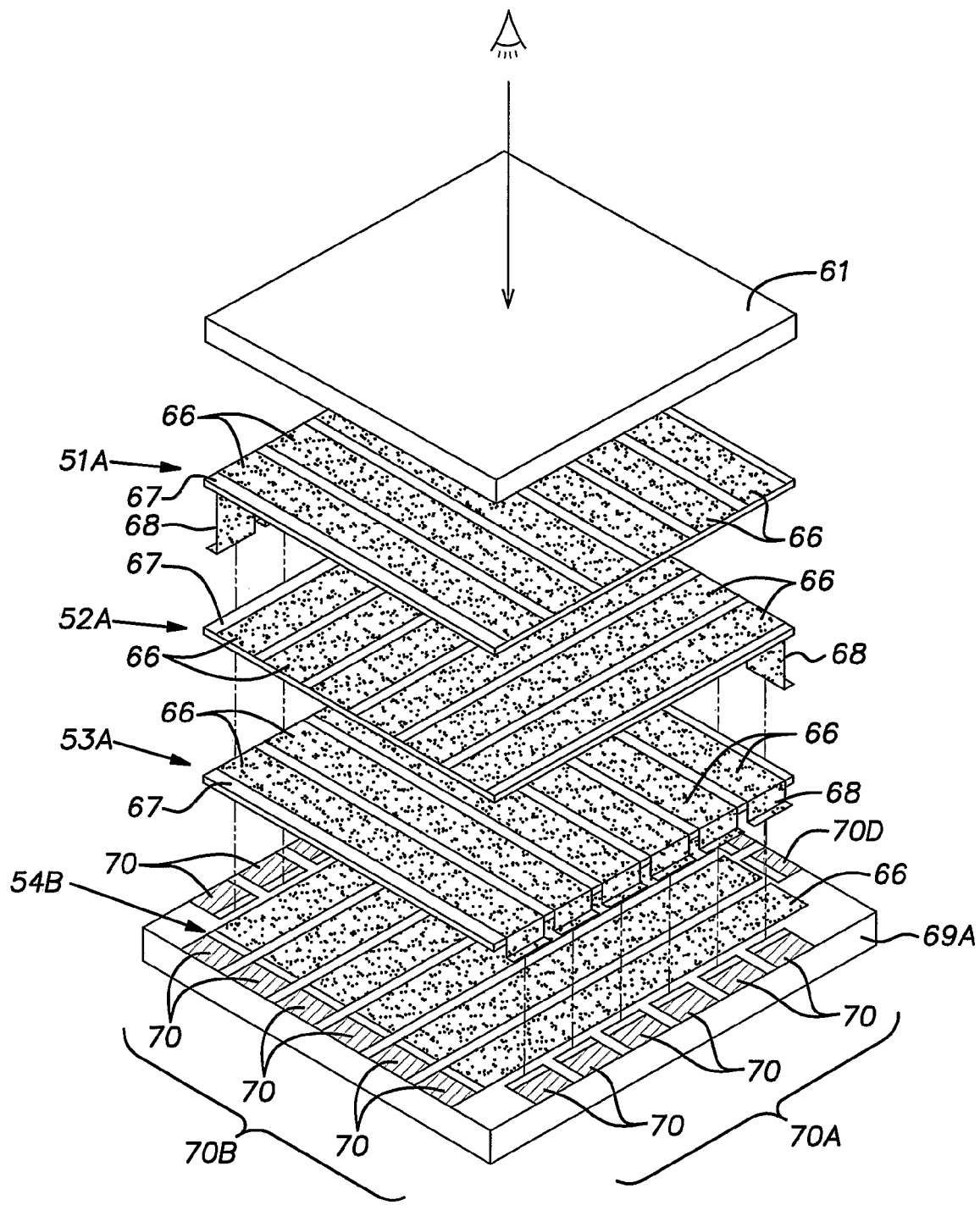
FIG. 8 is a schematic of an exploded view of a modified version of the display of FIGS. 7A and 7B.
Figure 12:
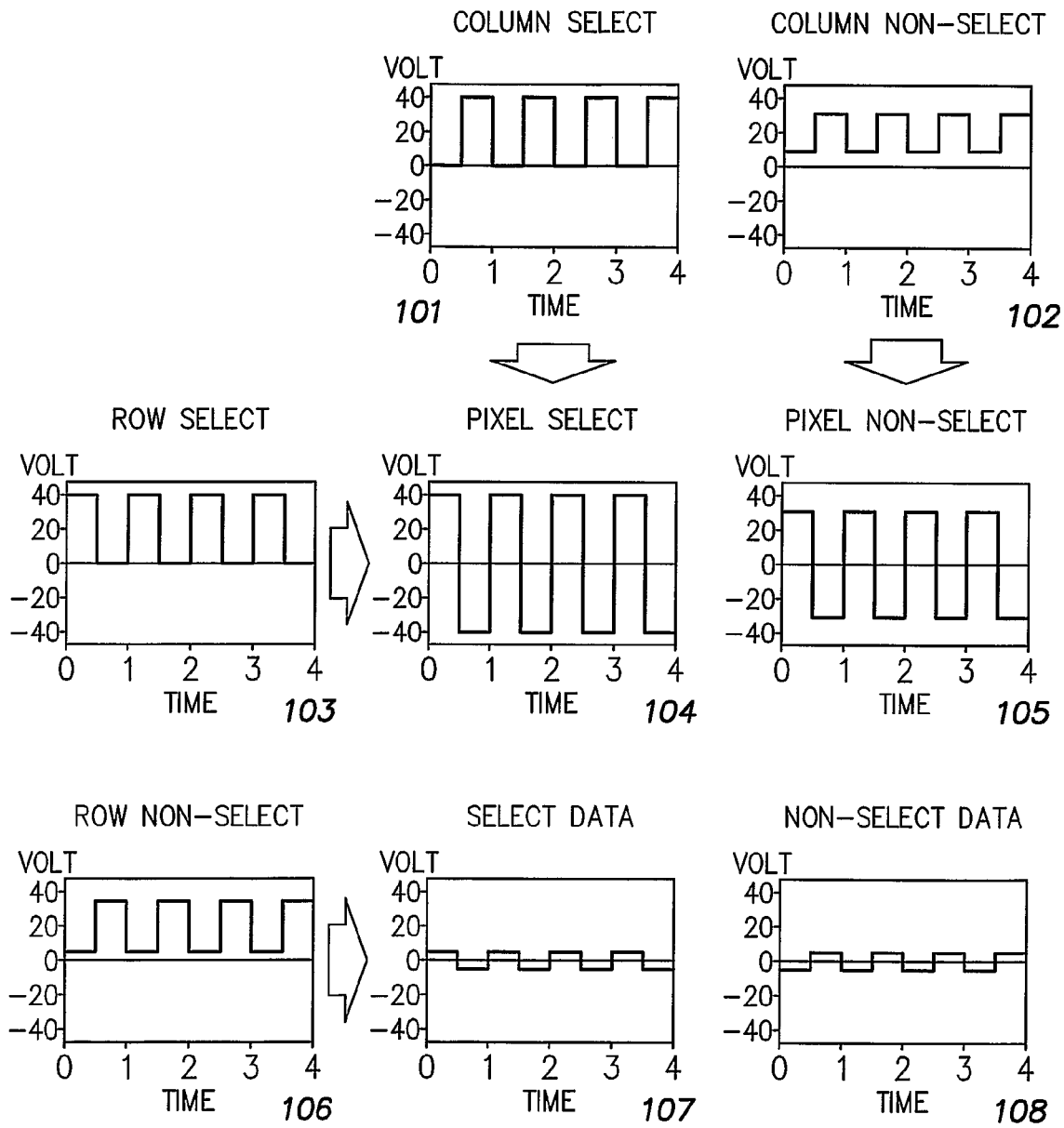
FIG. 12 shows an example sequence of drive voltages for driving the display according to the invention.

FIG. 12 provides one example of voltages useful for driving a display such as shown in FIG. 8. Again, as discussed above, the use of the terms "row" and "column" are relative, and can be interchanged. The row waveform (also called the "common") provides either a "select" 103 or "non-select" 106 type of voltage waveform. A "row select" waveform enables the row of pixels to be addressed because the phase of the "row select" waveform is such that, when combined with the "column select" waveform, the resulting pixel waveforms are of a voltage magnitude high enough to induce a state change (see 104). Conversely, the "row non-select" waveform has a phase relationship which, when applied along with a "column non-select" waveform 102 on the opposite electrode, will not cause a state change in the pixels (see 108). Similarly, combining a "row select" waveform 103 with a "column non-select" waveform 102 will result in a pixel non-select waveform 105. Combining a "row non-select" waveform 106 with a "column select" waveform 101 will result in a non-select waveform 107. This is the standard passive matrix addressing scheme used today.

This invention extends this traditional addressing method by utilizing the fact that there are other combinations of electrode waveforms that can be applied to the display that also result in no pixel change. As previously described, the most common method is to apply a Row Non-Select waveform to one set of electrodes and column data waveforms to the other perpendicular electrodes. This will result in net waveforms shown in FIG. 12 labeled "Select Data" and "Non Select Data". In either case, the magnitudes of the resulting waveforms on the pixels are not high enough to cause a pixel state change. However, it is also possible to get resulting waveforms of zero volts by applying a "Row Non-Select" waveform to both of the perpendicular electrodes. If the same waveform is applied to the rows and columns, the resulting voltage on the pixels will be net zero volts.

For example, referring to FIG. 12 as applied to a bistable, cholesteric display, the Pixel Select waveform 104 is applied to a pixel to drive it to the bright (planar) state. The Pixel Non-Select waveform 105 is applied to a pixel to drive it to the dark (focal conic) state.

The Pixel Select waveform 104 has a sufficiently high magnitude to drive the pixel to a Homeotropic/planar (bright) state while the Pixel Non-Select waveform 105 has a magnitude that will drive the pixel to the focal conic (dark) state. Typically, the entire display can also be reset to the focal conic state at the beginning of the update (i.e., a "bulk erase"). More generally, however, both waveforms 104 and 105 are capable of inducing a state change.

In contrast, the Select Data and Non-Select Data waveforms, 107 and 108, respectively, are applied to all of the rows that are non-selected (not being addressed). The magnitude of both of these waveforms is the same or similar, and is sufficiently low enough to not cause any change in pixel state. The waveforms differ in phase only depending upon if the column waveform is a Column Select 101 or a Column Non-Select 102 waveform.

Each primary color pixel in traditional display technologies (which are side-by-side) can be treated as a separate pixel, and be independently addressed. However, such designations as "row" and "column" as used herein are purely arbitrary in the invention, because they could be interchanged with each other.

Nevertheless, such drive modes can be partially applied to the stacked display, except that the color "pixels" are stacked and share electrode layers. Therefore, the scheme must be modified to accommodate this change, such as addressing the color layers in sequence.

For example, in one embodiment, the top and bottom drivers driving electrode layers 51 and 54, respectively, are always driven in a row (or alternatively, column) voltage mode configuration when selected. The middle two drivers driving electrode layers 52 and 53, when selected, can change their drive mode according to which layer is targeted for addressing. Thus, the layer being addressed is driven using standard passive matrix techniques while the remaining two layers are placed into a non-select mode so that their content will not be affected. As mentioned, this is only one embodiment. Layers 51 and 54 need not always have row waveforms such as mentioned in 2(c) below.

Applying the above technique to the embodiment of FIG. 6 using a bistable LC material that maintains its state in the presence of a zero voltage field results in the following sequence of events to set the pixel to the desired final state:

1. Addressing the first LC layer 31 in step 60A of FIG. 6:
    a. Electrode layer 51: Select-Row voltage mode; Here, one-by-one, the row electrodes in layer 51, in turn, will apply a "Row Select" waveform while the other row electrodes in layer 51 apply a non-select row waveform.
    b. Electrode layer 52: Select-Column voltage mode; These waveforms, shown in FIG. 12 as "Column Select" and "Column Non-Select", will change or maintain, respectively, the states of the actual sub-pixels in the layer 51 selected row while not affecting the sub-pixels in the layer 51 non-selected rows.
    c. Electrode layer 53: Non-Select-Voltage mode in phase with layer 52/54; Here, it does not matter if the sub-pixel states in this layer 32 are modified, as they will be addressed later in step 2. However, the pixels here will not be changed if the non-select row voltage waveforms, labeled "Row Non-Select" in FIG. 12, are applied to this electrode layer 53. This will result in magnitudes of sub-pixel voltage waveforms on this layer that are not sufficiently large enough to change the existing states of the sub-pixels.
    d. Electrode layer 54: Non-Select-Voltage mode in phase with layers 52/53. This layer will receive the "Row Non-Select" (106) waveforms of FIG. 12. The net result on the pixels in this LC layer 33 will be near zero volts (see 107, 108). As such, the content of this layer will not change. However, as with the LC layer 32, it is not necessary for this layer not to change as the intention is to address this layer in step number three.

2. Addressing the second LC layer 32, step 60B of FIG. 6:
    a. Electrode layer 51: Non-Select-Voltage mode in phase with layer 52. The current sub-pixel state achieved in step one is maintained here.
    b. Electrode layer 52: Select-Column voltage mode; The column waveforms applied here reflect the desired image content for the subpixels for layer 32.
    c. Electrode layer 53: Select-Row voltage mode; Here one of the electrodes, in turn, will apply a "Row Select" waveform while the other electrodes in this layer apply a row non-select waveform. The sub-pixels in the row that receives the "Row Select" waveform will be addressed to the states determined by the column waveforms of electrode layer 52.
    d. Electrode layer 54: Non-Select-Voltage mode in phase with layer 53. As this layer is intended to be addressed in the third step (60C of FIG. 6), it is not a concern if the sub-pixels in this layer 33 are affected during this step. If it is desired to maintain the sub-pixel state in layer 33 while layer 32 is addressed, the appropriate column waveforms can be applied to layer 54. Thus, the system could then effectively address layer 32 and layer 33 at the same time and possibly with different image content. This would then eliminate the need for step three below as now all three layers of the stack system have been addressed. However, due to display controller limitations involved with handling two sets of image column data simultaneously, it is also possible to address the third layer separately per step 3. This is performed by layer 54 alternatively having Row Non-Select voltage waveforms. These waveforms will destroy the image content on layer 33 but will consume minimal power. This alternative will force the addressing of the third layer (step three) whereas the original method leaves this optional as the image content is still valid.

3. Addressing the third LC layer 33, FIG. 6, step 60C:
    a. Electrode layer 51: Non-Select-Voltage mode in phase with layers 52/53;
    b. Electrode layer 52: Non-Select-Voltage mode in phase with layers 51/53;
    c. Electrode layer 53: Select-Column voltage mode;
    d. Electrode layer 54: Select-Row voltage mode.

In the above scenario, the non-selected electrode layer voltage drive mode such as in step 1(d) is chosen to provide a net zero or near zero voltage field across the LC layer not being addressed (and thus not undergoing a state change), and therefore the non-selected electrodes can be driven in phase with the electrode layer on the opposite side of that LC layer. This results in the desired near net zero voltage across the LC layer whose state is to be maintained (i.e., not changed). Similarly, the non-selected electrode layer voltage drive mode can be combined opposite of a column drive voltage layer such as in step 1(c) to achieve a desired net voltage across the LC layer whose magnitude is not sufficient to cause a state change. The actual sequence is arbitrary, but in this embodiment one LC layer is addressed at a time, whereas the electrode voltages described for that step are applied concurrently.

In some embodiments or drive modes, one particular sequence might be advantageous over another (such as for reducing cross-talk effects, for example). Finally, the drive voltage mode can be independent of the geometric layout of the electrode layer. Thus, whether a layer is ultimately to represent a "row" or a "column" in the display is arbitrary, and the driver mode need not necessarily be restricted to a corresponding "row" or "column" voltage. In fact, in the above embodiment, the driver voltage mode changes depending on the LC layer being addressed (for example, in step 2, electrode layer 53 is driven with a row drive voltage mode whereas in step 3, electrode layer 53 is driven with a column drive voltage mode).

For a passive matrix display utilizing a bistable ChLC, for example, during the addressing of the first (top) LC layer 31 (a blue sub-pixel, for example), this LC layer achieves pixel voltages created by the differential between the "column" voltages applied to the upper middle electrode layer 52 and the "row" voltages applied to the top electrode layer 51. These voltages are provided such that their difference is sufficiently above the switching threshold voltage of the material to allow the selected pixels to switch to the appropriate state. The display is addressed by selecting the appropriate "rows" to be updated (out of phase with the column drivers) and placing the other "rows" and/or "columns" in a non-select mode (e.g., in phase with the column drivers). This is the typical passive matrix driving sequence performed by a display such as that disclosed in Reference Driving Method for Polymer Stabilized and Polymer Free Liquid Crystal Displays U.S. Pat. No. 5,644,330 to Catchpole, Yuan, Lu, Huang, incorporated by reference.

During this first LC layer 31 addressing, the second LC layer 32 (a green sub-pixel, for example) has its row driver non-selecting all of its "rows" (for example, by matching the corresponding "column" voltages of the upper middle electrode layer 52). This prevents any pixels in the second LC layer 32 from receiving voltages above the switching threshold, thus maintaining their current state. At this same time, the third LC layer 33 (e.g., red sub-pixel) is driven with non-select voltages on both of its electrode layers 53, 54 (again, by matching the column voltages of the first LC layer). This gives the pixels in the third layer no voltage as the row non-select waveforms cancel out.

For addressing the second (middle) LC layer 32 (e.g., green sub-pixel), a pixel is addressed by conventional passive matrix techniques in which the "rows" to be addressed are selected by the row driver driving the lower middle electrode layer 53, for example. The column driver provides the image content (pixel data) to the upper middle electrode layer 52. The first and third LC layer's content is preserved by placing all of its "row/column" drivers into a non-select mode (i.e., by the top electrode layer 51 matching the "column" voltage of the upper middle electrode layer 52 and by the bottom electrode layer 54 matching the lower middle electrode layer 53 "row" voltage).

When addressing the second LC layer, the other LC layers may receive some undesired crosstalk due to stray voltages. For example, the third LC layer 33 (red sub-pixel) will likely receive some cross-talk as the middle display updates. However, this is typically not a concern as its content will be addressed in the next step in the sequence.

The third (bottom) LC layer 33 (red sub-pixel) is addressed using typical passive matrix techniques while the top and middle display layers maintain their previously addressed content, in a manner similar to that described above. The first LC layer 31 will see no net voltage as both of its electrode layers can be set to the same drive voltage (in phase). The second LC layer will only see voltages below the switching threshold as its electrode layers are placed in non-select mode. Accordingly, by processing each pixel according to the above sequence, each individual pixel can be updated and thus the entire display can be updated.

The described sequence can be equally successful using different orders of addressing. That is, the technique does not require the first-second-third (top-middle-bottom) sequence. Other sequences can be implemented in a like manner as would be apparent to those skilled in the art in view of this disclosure.

The invention as described above allows the different display layers to share driver electronics while preventing crosstalk to the layers that are not being addressed to avoid state transitions in layers where such transitions are not desired. The above method can be extended if multiple layers can be driven with the same parameters. For example, if the Green layer (second/middle LC layer in the example) and Red layer (third/bottom LC layer in the example) share the same drive parameters, they can be addressed at the same time. This then only leaves the blue layer to be addressed in a second scan, which can speed up the update process. Further, in some scenarios, all three layers might be updated simultaneously. For example, if they are all to be set to the same shade, the electrode layers could alternate row/column drive voltages to set the entire pixel at the same time. Finally, it would even be possible, under some scenarios, to update two or more layers simultaneously, even if they have different drive parameters, by proper manipulation of the drive voltages, such that each LC layer sees the proper voltage difference.

The above process can be demonstrated by the following sequence, referring back to FIGS. 5 and 6. To update the second and third LC layers 32, 33 simultaneously, electrode layer 52 is selected, and driven by, for example, a column voltage, electrode layer 53 is selected and driven by a row voltage, and electrode layer 54 is selected and driven by a column voltage. Finally, electrode layer 51 is non-selected, and thus driven by the column voltage matching the layer 52 driven voltage, for example. In this manner, LC layers 32, 33 are updated because they see a voltage difference, but LC layer 31 is not. By adjusting the voltages of the various layers, it is not necessary that LC layers 32 and 33 see the same voltage difference, and hence they could be updated to different shades.

The control of these shared electrode drive methods can be achieved by using commercially available display drivers that have both row and column drive functionality. These drivers can switch operation modes by setting input configuration pins on the devices. Thus, after an addressing sequence, the display controller would modify the driver chip configuration settings as necessary to accommodate the desired waveforms for the next updating stage.

To utilize the above driver, the driver IC configuration setting and the logic signals that are provided to the IC are modified. That is, these types of driver ICs require different logic signals depending upon the mode setting (row or column mode). For example, in column mode the drivers usually require an eight bit wide data bus, while the same driver configured in row mode typically will only require one serial data input. These types of input logic requirements that change with mode configuration can be accommodated by switching the logic signals applied to the drivers at the same time as the configuration mode is changed.

The details of the logic functions that must be switched is driver design dependant, but can be accommodated with switch banks or configurable controller outputs. Similarly, the voltage levels supplied to the driver ICs will also change when the mode changes. Because the column waveforms and row waveforms use different voltage inputs, these can be actively switched when the mode is changed between row and column functionality. This can be accommodated with analog switches which appropriately select the correct voltage input levels depending upon mode configuration.

In a system where the LC layers are separated by conducting electrodes (which may or may not include isolation or electrically insulating layers (e.g., films)), the layers are desired to be sufficiently thin enough not to significantly attenuate the drive voltages. This can enable design of a display system with a four edge interconnect.

Figure 7A:
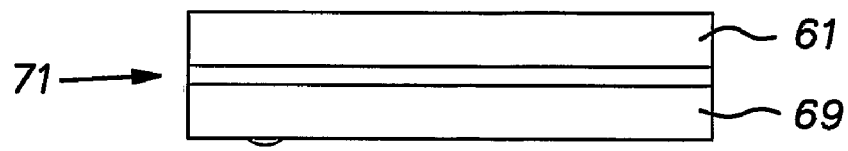
FIG. 7A shows a schematic of a side view of a display system of an aspect of the invention manufactured using a layer deposition process.
Figure 7B:
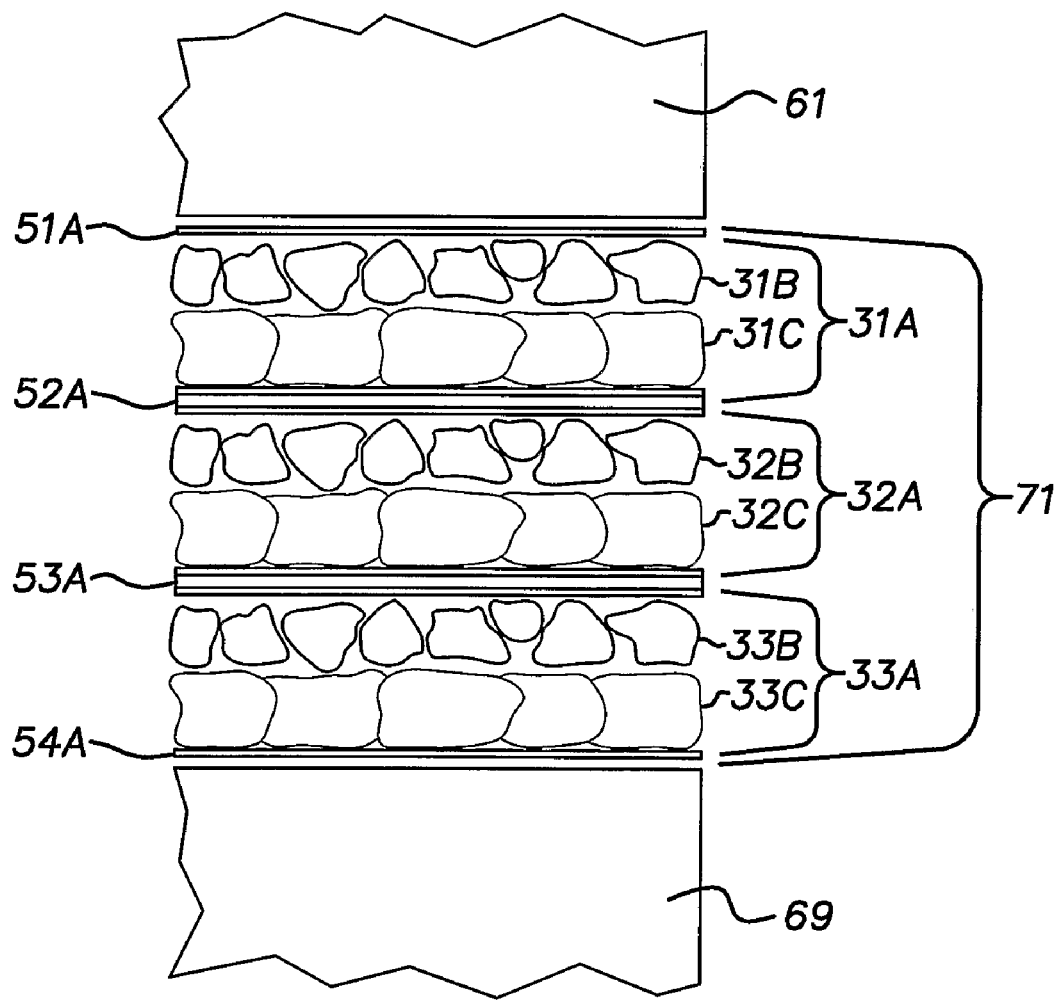
FIG. 7B is a schematic of an exploded view of FIG. 7A.

An example is a display system built from multi-layer thin film deposition, as shown in FIGS. 7A, 7B, and 8. In this case, the display device of FIG. 8 is built of multiple layers, with a transparent protective layer 61 of glass or other suitable material such as polymer, for example, and the LC material 71 on a substrate 69.

As shown in more detail in FIG. 7B, the LC material 71 is made up of three LC layers 31A, 32A, and 33A, each between a pair of electrode layers 51A, 52A, 53A and 54A. The display of FIG. 7B is made of six LC sub-layers, 31B, 31C; 32B, 32C; and 33B, 33C. Two sub-layers of LC are coated between adjacent electrode layer and can be driven together. Typically, the LC sub-layers of each LC layer are similar such as both reflecting the same color but with different reflecting handedness (right-handed light reflecting or left-handed light reflecting) to optimize brightness. Because both LC sublayers between adjacent electrode layers (e.g., 31B, 31C) are so similar, they can use the same drive parameters (voltage amplitude and pulse width). The electrode layers may be formed on or integrated with, substrate materials.

FIG. 8 further shows a possible construction of the electrode layers 51A, 52A, 53A, and a layer 54B that is deposited on a bottom substrate layer 69A, instead of the discrete layer 54A shown in FIG. 7B.

The manufacturing process can be accomplished starting with the bottom electrode layer 54B on a bottom substrate material 69A. This system can be understood by the following layer descriptions relating to FIG. 8.

The bottom substrate 69A has rugged interconnect pads 70 formed thereon which provide means to electrically connect drive circuitry to the display electrodes. These pads 70 can be made from patterning ITO on the substrate 69A.

Conductive electrode lines 66 can then be printed or deposited as the bottom electrode layer 54B directly onto the bottom substrate 69 so that they overlap a portion of the ITO electrode pads 70B. This allows connectivity between the ITO pads 70B and the conductive traces of the bottom electrodes 54B. An exemplary material for making the electrodes could be a conductive polymer, carbon nanotubes or a deposited metal (e.g., ITO). The appropriate voltages used to achieve the planar and focal conic textures are dependent on the compositions and thicknesses of the layers of the display. Suitable such voltages may be selected by one of ordinary skill in the art in view of the particular characteristics of the display layers.

The printed bottom electrodes 66 in layer 54B should not overlap the entire ITO pad. Enough ITO pad should be exposed for external interconnection of drive circuitry. It is possible that the conductive traces might not be rugged enough to provide interconnect to the external drive electronics. To address this issue it may be suitable to apply the ITO etched pads 70 first.

The liquid crystal (third/bottom) layer 33A shown in FIG. 7B is then deposited as by printing or coating on top of the bottom electrodes 54B. Multiple LC layers of different optical properties can be used as demonstrated in FIG. 7B (sub-layers 31B & 31C making up LC layer 31A; sub-layers 32B & 32C making up LC layer 32A; and sub-layers 33B and 33C making up LC layer 33A, for example).

Thin isolation or electrically insulating films can be placed between adjacent liquid crystal layer(s), between liquid crystal sublayers and between electrode layers and liquid crystal layers, if desired as disclosed in the Display Films Application. This step is optional as in some cases it may not be necessary to provide a physical separating layer between the layers of encapsulated liquid crystal depending upon their solubility with each other and electrical insulation properties of the liquid crystal layers. This is the same principle that optionally enables two layers of liquid crystal to be stacked on each other as shown in FIG. 7B by the layers labeled "3×B and 3×C", respectively, where x is 1, 2, or 3.

A next layer of conducting material is then deposited as by printing or coating onto an optional isolation or electrically insulating layer 67 forming electrodes 66, so as to create a lower middle electrode layer 53A. The direction of the electrode lines 66 are placed parallel to each other and perpendicular to the lines of the layer of electrodes immediately underneath to create the passive matrix structure. The electrode deposition continues down one side of the stack and overlaps a portion of the ITO bonding pads 70A via links 68 as shown in FIG. 8.

Figure 9:
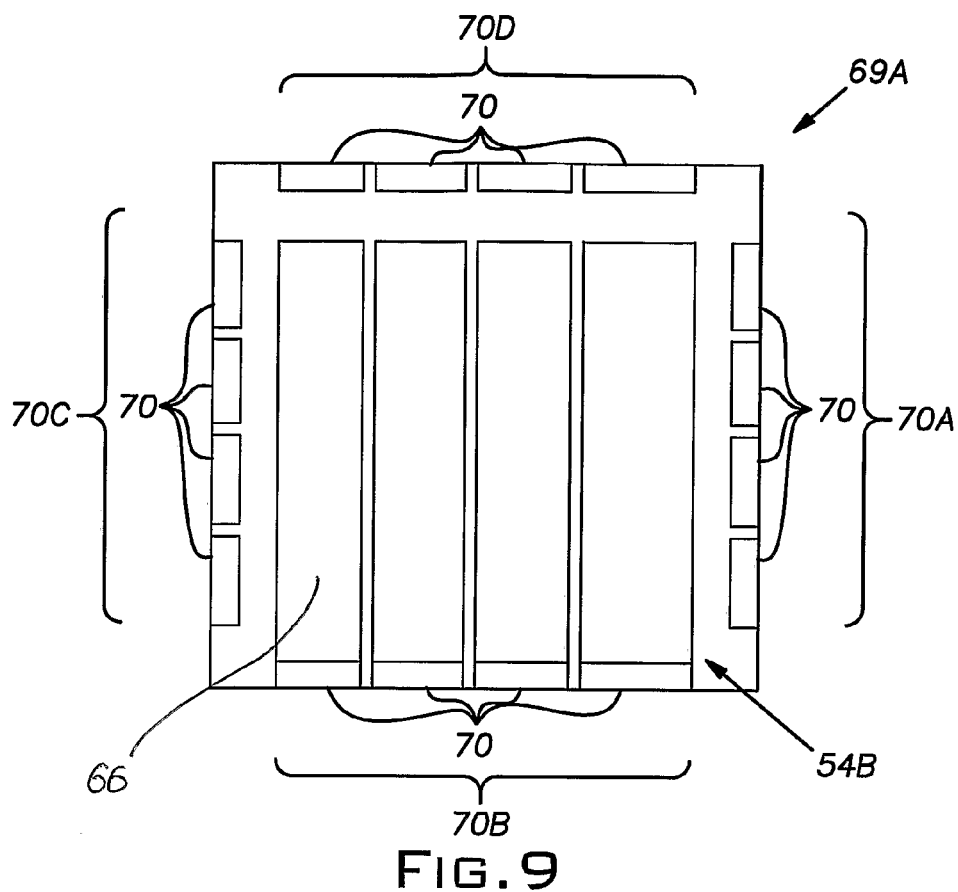
FIG. 9 is a schematic of an overhead view of the substrate 69A with lower electrode layer 54B.

The LC and electrode layer steps described above can be repeated to create the additional display layers. Fabrication of the inventive films can be carried out directly on the substrate as disclosed in the Flexible Display Application or by preparing, curing and lifting from a release surface and then transferring to the substrate (e.g., substrate 69A) as disclosed in the Flexible Display Application and Display Films Application. FIG. 7B demonstrates three different LC layers 31A, 32A, and 33A. FIG. 7B demonstrates four electrode layers 51A, 52A, 53A, and 54A with LC color layers 31A, 32A, and 33A (each made of two discrete LC layers as described above). The electrode layers 52A and 53A are shown having isolation or electrically insulating layers on both sides thereof. FIG. 8 also demonstrate four electrode layers 51A, 52A, 53A, and 54B terminating on all four sides of the bottom substrate 69A. LC layers would be placed between electrode layers 51A/52A, 52A/53A, and 53A/54B, for example. FIG. 9 shows the lower electrode layer 54B as seen from an overhead view, with electrode lines 66 on the substrate 69, also showing the pads 70.

It is possible to provide protection to the display system by placing a transparent cover layer 61 on the assembly as shown in FIGS. 7B and 8. This could be glass, flexible plastic, or simply a laminated protective polymer cover layer formed as by printing or coating on the underlying layer.

Each of the electrode lines 66 for each electrode layer shown in FIG. 8 will terminate on an edge of the display bottom substrate, typically with electrode lines from each electrode layer terminating on a different edge so that electrode lines from the same layer terminate on the same edge. This design enables the elimination of display interconnect materials as the display can be directly bonded to a common drive circuit. This is typically not possible when driver electrodes are facing opposite directions as with typical display systems.

The display system has the ability to be designed to be viewed from either the top or the bottom of the stack, by making the substrate 69, protective layer and electrode layers upstream of the lower liquid crystal layer in a direction of incident light, transparent. The unique interconnect system allows either side of the display to be the viewing side. Thus, the display system could be flipped over and bonded directly to a flexible drive circuit. This eliminates a set of interconnects that are required for traditional display systems. This is possible due to the flexibility of the substrate and the fact that all of the electrodes face the same direction.

Figure 10:
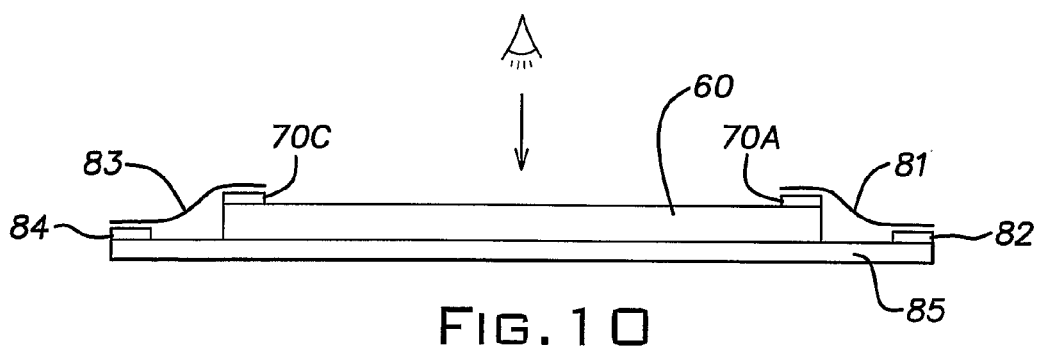
FIG. 10 is a schematic view of an interconnection method of one aspect of the invention of FIG. 9.
Figure 11:
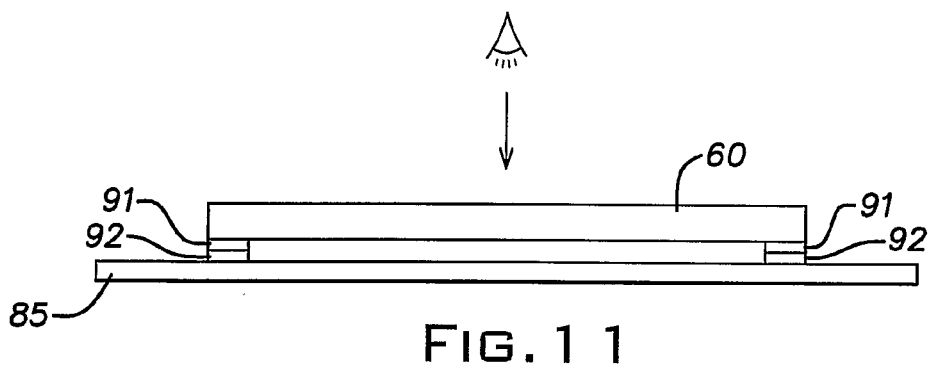
FIG. 11 is a schematic view of another interconnection method of another aspect of the invention of FIG. 9.

These two types of interconnection methods are shown in FIGS. 10 & 11. The methods and systems described herein are demonstrated using a triple stack configuration of FIG. 8, for example. However, a two LC display stack system can utilize these techniques as well as display systems with more than three LC layers. This becomes likely when considering display systems combining LC layers of visible and infra-red wavelengths such as a four LC layer stack display system of red, green, blue and IR LC layer. This can also be extended to multiple layers of IR where the multiple layers reflect different wavelengths of IR light.

The display of FIG. 10 includes multi-layer LC display stack 60 supported on a flexible PCB with drive electronics 85. Copper bonding pads 82 and 84 are formed on the PCB 85. Display ITO pads 70A, 70C are formed on the display 60. Flexible electrode interconnect films 81, 83 are each bonded to the ITO pads on one end and to the copper bonding pads on the other end. The display is viewed in the direction of the arrow; to this end various components are made suitably transparent.

The display of FIG. 11 includes the multi-layer LC display stack 60 supported on the flexible PCB with drive electronics 85. Display ITO pads 91 are formed on the display. Copper bonding pads 92 are formed on the PCB 85. In this design the display is flipped 180 degrees relative to FIG. 10 and does not require flexible interconnect material. The ITO pads are bonded directly to the copper bonding pads. The display is viewed in the direction of the arrow; to this end various components are made transparent.

When implementing this invention the same general design guidelines apply to the conductive electrodes as for a conventional passive matrix display. Specifically, the design of the row and column electrodes should be sufficiently low enough in resistance to maintain the desired voltage across the display. That is, the voltage at the driving source of the electrode shall not differ significantly in magnitude from one end of the electrode to the other. This situation must be considered during the current flow condition while charging and discharging of the pixel capacitance across the electrode. In practice there is always a resistance associated with the electrode so there will always be a voltage differential along the electrode. This differential must be kept small enough to not cause pixels at one end of the electrode to switch to different states than the pixels at the other end near the voltage source.

The invention has been described hereinabove using specific examples; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

What is claimed is:

1. A liquid crystal display having a plurality of stacked layers comprising:
    a plurality of layers of liquid crystal material each having opposing surfaces;
    a plurality of electrically conductive layers disposed so as to be located near both of said opposing surfaces of said liquid crystal layers, wherein each pair of adjacent liquid crystal layers has exactly one of said electrically conductive layers disposed between said pair of adjacent said liquid crystal layers; and
    drive electronics adapted to apply voltage pulses to each of said pair of adjacent liquid crystal layers along the electrically conductive layer provided between said pair of adjacent liquid crystal layers for driving both of said pair of adjacent liquid crystal layers.

2. The liquid crystal display of claim 1 wherein said drive electronics includes one driver corresponding to each of said electrically conductive layers.

3. The liquid crystal display of claim 2 wherein said driver comprises multiple drive chips.

4. The liquid crystal display of claim 1 wherein said liquid crystal material comprises regions of liquid crystal dispersed in a polymer matrix.

5. The liquid crystal display of claim 4 wherein said liquid crystal material comprises bistable cholesteric liquid crystal.

6. The liquid crystal display of claim 1, wherein electrode lines of one of said electrically conductive layers are arranged perpendicular to electrode lines of an adjacent one of said electrically conductive layers.

7. The liquid crystal display of claim 1, wherein said display is comprised of a plurality of pixels, with each pixel including a sub-pixel from each of said plurality of layers of liquid crystal material, wherein when a pixel is to be updated, the sub-pixels are addressed in sequence, such that while one sub-pixel is addressed to impose a brightness state change on that sub-pixel the remaining sub-pixels of that pixel are simultaneously addressed to maintain their current brightness state.

8. The liquid crystal display of claim 1 comprising only a single substrate on which said layers of the display are supported.

9. The liquid crystal display of claim 1, wherein one of said electrically conductive layers is arranged on top of said stacked layers, and wherein another of said electrically conductive layers is arranged on bottom of said staked layers.

10. The liquid crystal display of claim 1, wherein said voltage pulses applied to adjacent liquid crystal layers are provided such that a portion of one of said layers is being addressed for an update, wherein a portion of the other of said liquid crystal layers is simultaneously being addressed to maintain its current state.

11. The liquid crystal display of claim 1, wherein each conductive layer includes electrodes that are arranged perpendicular to any adjacent conductive layer(s).

12. A stacked liquid crystal display sequentially comprising the following stacked layers:
    a top electrode layer of electrodes;
    a first liquid crystal layer;
    an upper middle electrode layer of electrodes;
    a second liquid crystal layer;
    a lower middle electrode layer of electrodes;
    a third liquid crystal layer;
    a bottom electrode layer of electrodes; and
    a shared electrode addressing construction in which said upper middle electrode layer is adapted to enable driving of said first liquid crystal layer and said second liquid crystal layer and said lower middle electrode layer is adapted to enable driving of said second liquid crystal layer and said third liquid crystal layer.

13. The stacked liquid crystal display of claim 12, adapted such that a reflective state of a portion of said first liquid crystal layer corresponding to a pixel of said display is changed by providing a first non-zero voltage difference between an electrode of said top electrode layer and an electrode of said upper middle electrode layer.

14. The stacked liquid crystal display of claim 13, adapted such that a reflective state of said portion of said first liquid crystal layer is maintained by providing a voltage difference less than a voltage threshold needed to change a reflective state of the liquid crystal between said top electrode layer and said upper middle electrode layer.

15. The stacked liquid crystal display of claim 13, adapted such that a reflective state of a portion of said second liquid crystal layer also corresponding to said pixel of said display is changed by providing a second non-zero voltage difference between an electrode of said upper middle electrode layer and an electrode of said lower middle electrode layer.

16. The stacked liquid crystal display of claim 15, adapted such that a reflective state of a portion of said third liquid crystal layer also corresponding to said pixel of said display is changed by providing a third non-zero voltage difference between an electrode of said lower middle electrode layer and an electrode of said bottom electrode layer.

17. The stacked liquid crystal display of claim 16, adapted such that said reflective states of said portions of said first, second and third liquid crystal layers all corresponding to said pixel of said display are updated sequentially in time to update a state of said pixel.

18. The stacked liquid crystal display of claim 16, adapted such that the reflective states of two of said portions of said first, second and/or third liquid crystal layers each corresponding to said pixel of said display are updated concurrently in time to at least partially update a state of said pixel.

19. The stacked liquid crystal display of claim 12, wherein said first liquid crystal layer, said second liquid crystal layer and said third liquid crystal layer comprise a dispersion of cholesteric liquid crystal in a polymer matrix.

20. A stacked liquid crystal display sequentially comprising the following stacked layers:
a top electrode layer of electrodes; a first liquid crystal layer; an upper middle electrode layer of electrodes; a second liquid crystal layer;
a lower middle electrode layer of electrodes;
a third liquid crystal layer;
a bottom electrode layer of electrodes; and
a shared electrode addressing construction in which said upper middle electrode layer is adapted to enable driving of said first liquid crystal layer and said second liquid crystal layer and said lower middle electrode layer is adapted to enable driving of said second liquid crystal layer and said third liquid crystal layer, wherein
said display is adapted such that a reflective state of a portion said first liquid crystal layer corresponding to a pixel of said display is changed by providing a voltage difference between an electrode of said top electrode layer and an electrode of said upper middle electrode layer, and adapted such that a reflective state of a portion said second liquid crystal layer corresponding to said pixel of said display is changed by providing a voltage difference between an electrode of said upper middle electrode layer and an electrode of said lower middle electrode layer, and further adapted such that a reflective state of a portion of said third liquid crystal layer corresponding to said pixel of said display is changed by providing a voltage difference between an electrode of said lower middle electrode layer and an electrode of said bottom electrode layer; thereby updating a state of said pixel of said display.

21. The stacked liquid crystal display of claim 20 wherein a threshold voltage is needed to change a reflective state of the liquid crystal, said display being adapted such that a reflective state of said portion of said first liquid crystal layer is maintained by providing a voltage difference between said electrode of said top electrode layer and said electrode of said upper middle electrode layer below said threshold voltage, and adapted such that a reflective state of said portion of said second liquid crystal layer is maintained by providing a voltage difference between said electrode of said upper middle electrode layer and said electrode of said lower middle electrode layer below said threshold voltage, and further adapted such that a reflective state of said portion of said third liquid crystal layer is maintained by providing a voltage difference between said electrode of said lower middle electrode layer and said electrode of said bottom electrode layer below said threshold voltage.

22. The stacked liquid crystal display of claim 21, further adapted such that the reflective states of two or more of said portions of said first, second, and third liquid crystal layers are updated sequentially in time.

23. The stacked liquid crystal display of claim 21, further adapted such that the reflective states of two or more of said portions of said first, second, and third liquid crystal layers are updated concurrently in time.

24. The stacked liquid crystal display of claim 21, further adapted such that the electrodes of one of said electrode layers are arranged perpendicular to the electrodes of an adjacent one of said electrode layers.

25. A stacked liquid crystal display comprising:
a top electrode layer of electrodes;
an upper middle electrode layer of electrodes;
a first liquid crystal layer sandwiched between said top electrode layer and said upper middle electrode layer;
a lower middle electrode layer of electrodes;
a second liquid crystal layer sandwiched between said upper middle electrode layer and said lower middle electrode layer;
a bottom electrode layer of electrodes; and
a third liquid crystal layer sandwiched between said lower middle electrode layer and said bottom electrode layer, wherein
a pixel of said display includes a portion of said first liquid crystal layer adapted to be addressed by the combination of an electrode of said top electrode layer and an electrode of said upper middle electrode layer, and wherein
said pixel of said display further includes a portion of said second liquid crystal layer adapted to be addressed by the combination of an electrode of said upper middle electrode layer and an electrode of said lower middle electrode layer, and further wherein
said pixel of said display further includes a portion of said third liquid crystal layer adapted to be addressed by the combination of an electrode of said lower middle electrode layer and an electrode of said bottom electrode layer.

26. The stacked liquid crystal display of claim 25, further adapted such that a brightness state of said pixel is updated by addressing said portions of said liquid crystal layers in sequence.

27. The stacked liquid crystal display of claim 25, wherein said electrodes of said upper middle electrode layer are arranged perpendicular to the electrodes of said top electrode layer and said lower middle electrode layer, and where said electrodes of said lower middle electrode layer are arranged perpendicular to the electrodes of said bottom electrode layer.

28. A stacked liquid crystal display comprising:
a top electrode layer of electrodes;
an upper middle electrode layer of electrodes;
a first liquid crystal layer sandwiched between said top electrode layer and said upper middle electrode layer, adapted such that a brightness state of a portion said first liquid crystal layer corresponding to a pixel of said display is changed by providing a non-zero voltage difference between an electrode of said top electrode layer and an electrode of said upper middle electrode layer, and adapted such that a brightness state of said portion of said first liquid crystal layer is maintained by providing substantially no voltage difference between said electrode of said top electrode layer and said electrode of said upper middle electrode layer;

a lower middle electrode layer of electrodes;
a second liquid crystal layer sandwiched between said upper middle electrode layer and said lower middle electrode layer, adapted such that a brightness state of a portion said second liquid crystal layer corresponding to said pixel of said display is changed by providing a non-zero voltage difference between an electrode of said upper middle electrode layer and an electrode of said lower middle electrode layer, and adapted such that a brightness state of said portion of said second liquid crystal layer is maintained by providing substantially no voltage difference between said electrode of said upper middle electrode layer and said electrode of said lower middle electrode layer;
a bottom electrode layer of electrodes; and
a third liquid crystal layer sandwiched between said lower middle electrode layer and said bottom electrode layer, adapted such that a brightness state of a portion of said third liquid crystal layer corresponding to said pixel of said display is changed by providing a non-zero voltage difference between an electrode of said lower middle electrode layer and an electrode of said bottom electrode layer, and adapted such that a brightness state of said portion of said third liquid crystal layer is maintained by providing substantially no voltage difference between said electrode of said lower middle electrode layer and said electrode of said bottom electrode layer, wherein
said pixel is formed by a stacked arrangement of said portions of said first, second, and third liquid crystal layers such that a color of said pixel is formed by light reflecting from all of said portions of said first, second, and third liquid crystal layers, and further wherein
a brightness state of said pixel of said display is updated by changing and/or maintaining the brightness states of said portions of said first, second, and third liquid crystal layers sequentially or concurrently.

29. The stacked liquid crystal display of claim 28, wherein one or more of said first, second, and third liquid crystal layers include bistable cholesteric liquid crystal material.

30. The stacked liquid crystal display of claim 28, wherein said electrodes of said upper middle electrode layer are arranged perpendicular to the electrodes of said top electrode layer and said lower middle electrode layer, and where said electrodes of said lower middle electrode layer are arranged perpendicular to the electrodes of said bottom electrode layer.

31. The stacked liquid crystal display of claim 28, wherein said electrodes of said upper middle electrode layer are arranged perpendicular to the electrodes of said top electrode layer and said lower middle electrode layer, and where said electrodes of said lower middle electrode layer are arranged perpendicular to the electrodes of said bottom electrode layer.

32. A multi-layer stacked liquid crystal display film comprising:
a plurality of liquid crystal film layers; and
a plurality of electrode film layers for driving said plurality of liquid crystal film layers, wherein
all of said film layers are printed or coated in a stack upon each other, wherein
a pixel is formed from a portion of each of said plurality of liquid crystal layers, such that a color or shade of said pixel is formed by light reflecting from all of said portions of said plurality of liquid crystal layers, and wherein
at least one of said plurality of electrode layers is adapted to enable driving of two adjacent said liquid crystal layers.

33. The stacked liquid crystal display film of claim 32, wherein each of said portions of said plurality of electrode layers is driven sequentially in time to change or maintain said color of said pixel.

34. A stacked liquid crystal display comprising a base substrate and a plurality of film layers printed or coated onto each other in a stack and supported on said substrate, said film layers comprising:
a plurality of conducting film layers; and
a plurality of liquid crystal dispersion film layers each comprising regions of liquid crystal material dispersed in a polymer matrix, said liquid crystal dispersion layers being separated by said conducting layers, wherein
at least one of said plurality of conducting layers is adapted to enable driving of two adjacent said liquid crystal dispersion layers.

35. The display of claim 34 comprising flexible interconnects extending from each of said conducting film layers at a side of said display to conductors located on said substrate at the same side of said display.

36. The display of claim 34 wherein said plurality of liquid crystal dispersion layers includes at least three liquid crystal dispersion layers including bistable cholesteric liquid crystal material.

37. The display of claim 34 wherein said plurality of liquid crystal dispersion layers includes at least six liquid crystal dispersion layers including bistable cholesteric liquid crystal material.

38. A liquid crystal display comprising:
a first liquid crystal layer comprising liquid crystal that is bistable in an absence of an electric field;
a second liquid crystal layer comprising liquid crystal that is bistable in an absence of an electric field stacked upon said first liquid crystal layer, wherein said liquid crystal is a dispersion of liquid crystal in a polymer matrix;
a first electrode layer disposed between said first liquid crystal layer and said second liquid crystal layer;
a second electrode layer disposed between said first liquid crystal layer and said second liquid crystal layer;
electrical interconnects that electrically connect said first electrode layer and said second electrode layer together in parallel; and
drive electronics electrically connected to said electrical interconnects adapted to address both of said first liquid crystal layer and said second liquid crystal layer with the same voltage pulses.

39. The liquid crystal display of claim 38, wherein said liquid crystal layers reflect visible and infrared light.

40. The liquid crystal display of claim 38, wherein when said voltage pulses are applied to first and second liquid crystal layers, a portion of one of said liquid crystal layers is being addressed for a state update whereas a corresponding portion of the other of said liquid crystal layers is simultaneously being addressed to maintain its current state.

41. A liquid crystal display comprising:
a first liquid crystal layer comprising liquid crystal that is bistable in an absence of an electric field;
a second liquid crystal layer comprising liquid crystal that is bistable in an absence of an electric field stacked upon said first liquid crystal layer, wherein said first liquid crystal layer and said second liquid crystal layer comprise a dispersion of bistable cholesteric liquid crystal material in a polymer matrix;
only a single electrode layer disposed between said first liquid crystal layer and said second liquid crystal layer; and drive electronics electrically connected to said single electrode layer adapted to address both said first liquid crystal layer and said second liquid crystal layer with the same voltage pulses.

42. The liquid crystal display of claim 41, wherein said voltage pulses applied by said single electrode layer to said first and second liquid crystal layers such that a portion of one of said layers is being addressed for an update while simultaneously a portion of the other of said liquid crystal layers being addressed to maintain its current state.

43. A liquid crystal display having a plurality of stacked layers comprising:
a plurality of layers of liquid crystal material; and
a plurality of layers of electrodes such that each of said plurality of layers of liquid crystal material is adjacent to exactly two of said plurality of layers of electrodes, wherein
each one of said electrode layers provided between and adjacent to two layers of liquid crystal material is used to drive each one of said adjacent layers of liquid crystal material.

44. The liquid crystal display of claim 43, wherein each one of said electrode layers provided between and adjacent to two layers of liquid crystal material is used to drive each one of said adjacent layers such that said layers of layers of liquid crystal material are driven sequentially.

45. The liquid crystal display of claim 43, wherein each one of said electrode layers provided between and adjacent to two layers of liquid crystal material is utilized to provide a 'select' to one of said layers of liquid crystal material and simultaneously provide a 'non-select' waveform to another of said layers of liquid crystal material.

46. A liquid crystal display having a plurality of stacked layers comprising:
a plurality of layers of liquid crystal material; and
a plurality of layers of electrodes such that each of said plurality of layers of liquid crystal material is adjacent to exactly two of said plurality of layers of electrodes, wherein
each one of said pixel is comprised of plurality of sub-pixels, wherein each one of said sub-pixels is provided by one of said layers of liquid crystal material, and wherein
each pixel is driven by selectively driving, in sequence, each one of its corresponding sub-pixels one at a time while simultaneously deslecting the others of its sub-pixels.

47. A liquid crystal display having a plurality of stacked layers comprising:
a plurality of layers of liquid crystal material each having opposing surfaces and arranged in a stack;
a plurality of electrically conductive layers arranged such that one of said electrically conductive layers is at the top of the stack, one of said electrically conductive layers is arranged at the bottom of the stack, and each one of the remainder of said electrically conductive layers is arranged between a different adjacent pair of said layers of liquid crystal material; and
drive electronics adapted to drive said display such that each one of said electrically conductive layers that is arranged between a different adjacent pair of said layers of liquid crystal material is utilized to drive both layers of said adjacent pair of layers of liquid crystal material.

48. The liquid crystal display of claim 47, wherein each one of said electrically conductive layers provided between and adjacent to two layers of liquid crystal material is utilized to provide a 'select' to one of said layers of liquid crystal material and simultaneously provide a 'non-select' waveform to another of said layers of liquid crystal material.

* * * * *